(12) United States Patent
Yoshimura et al.

(10) Patent No.: US 11,726,028 B2
(45) Date of Patent: Aug. 15, 2023

(54) CONTAINER RACK, SPECIMEN ANALYSIS DEVICE, AND SPECIMEN ANALYSIS METHOD

(71) Applicant: SYSMEX CORPORATION, Kobe (JP)

(72) Inventors: Kenji Yoshimura, Kobe (JP); Masaki Shiba, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 645 days.

(21) Appl. No.: 16/786,251

(22) Filed: Feb. 10, 2020

(65) Prior Publication Data

US 2020/0271567 A1 Aug. 27, 2020

(30) Foreign Application Priority Data

Feb. 22, 2019 (JP) ................................ 2019-030136

(51) Int. Cl.
 *B01L 9/06* (2006.01)
 *G01N 21/11* (2006.01)
 (Continued)

(52) U.S. Cl.
 CPC ........... *G01N 21/11* (2013.01); *G01N 35/025* (2013.01); *G01N 35/04* (2013.01); *G01N 1/38* (2013.01)

(58) Field of Classification Search
 CPC ................. G01N 35/025; G01N 35/04; G01N 2035/041; B01L 9/06
 (Continued)

(56) References Cited

U.S. PATENT DOCUMENTS 3,127,773 A * 4/1964 Blumenfeld ....... G01N 35/1095
 73/864.24
5,482,863 A 1/1996 Knobel
 (Continued)

FOREIGN PATENT DOCUMENTS

CN 106622432 A * 5/2017 ................ B01L 9/02
EP 3396388 A1 * 10/2018 ............ B01L 3/5085
 (Continued)

OTHER PUBLICATIONS

Extended European search report dated Jun. 2, 2020 in a counterpart European patent application No. 20156586.8.
 (Continued)

*Primary Examiner* — Robert R Raevis
(74) *Attorney, Agent, or Firm* — Crowell & Moring LLP

(57) ABSTRACT

Disclosed is a container rack configured to hold a plurality of containers, the container rack configured to be installed in a rack installation portion of a specimen analysis device, the container rack comprising: a holding portion including a plurality of holding holes through which body portions of the containers pass and which hold head portions of the containers; and a leg portion configured to support the holding portion, the leg portion provided from the holding portion to below the containers held in the holding holes, wherein the leg portion is configured such that the containers in the holding holes are exposed in a bottom view, and wherein the container rack is configured such that when the container rack is installed in the rack installation portion of the specimen analysis device, movement of the containers held in the holding holes is restricted by the rack installation portion.

22 Claims, 23 Drawing Sheets

(51) Int. Cl.
  *G01N 35/02* (2006.01)
  *G01N 35/04* (2006.01)
  *G01N 1/38* (2006.01)

(58) Field of Classification Search
  USPC ...... 73/864.81, 863, 863.01, 864.21, 864.24, 73/864.25; 422/63, 65, 297, 300, 500, 422/558, 560–562; 220/736
  See application file for complete search history.

(56) References Cited

U.S. PATENT DOCUMENTS

| | | | |
|---|---|---|---|
| D466,219 S | 11/2002 | Wynschenk et al. | |
| 9,671,417 B2 | 6/2017 | Matsuura | |
| 9,696,329 B2 | 7/2017 | Makino et al. | |
| 9,782,778 B1 * | 10/2017 | Drynkin | B01L 9/06 |
| 2002/0108917 A1 | 8/2002 | Maruyama | |
| 2008/0072664 A1 * | 3/2008 | Hansen | G01N 1/38 |
| | | | 422/63 |
| 2012/0244047 A1 * | 9/2012 | Teng | B01L 7/04 |
| | | | 422/562 |
| 2014/0112845 A1 | 4/2014 | Edens et al. | |
| 2017/0043346 A1 | 2/2017 | Welch et al. | |
| 2018/0361388 A1 | 12/2018 | Welch et al. | |
| 2019/0070573 A1 | 3/2019 | Akiyama et al. | |

FOREIGN PATENT DOCUMENTS

| | | | | |
|---|---|---|---|---|
| ES | 2402227 T3 * | 4/2013 | ......... | G01N 35/0099 |
| JP | H4-265861 A | 9/1992 | | |
| JP | H5-17564 U | 3/1993 | | |
| JP | H5-92732 U | 12/1993 | | |
| JP | H5-92734 U | 12/1993 | | |
| JP | H11326342 A | 11/1999 | | |
| JP | 2014-21027 A | 2/2014 | | |
| JP | 2014-219361 A | 11/2014 | | |
| JP | 2015-127640 A | 7/2015 | | |
| JP | 5894878 B2 | 3/2016 | | |

OTHER PUBLICATIONS

Communication pursuant to Article 94(3) EPC dated Nov. 8, 2021 in European patent application No. 20156586.8.
Communication pursuant to Article 94(3) EPC dated Jun. 11, 2021 in a counterpart European patent application No. 20156586.8.
Japanese Office Action dated Feb. 27, 2020 in a counterpart Japanese patent application No. 2019-030136.
Decision of Refusal dated Nov. 17, 2020 in a counterpart Japanese patent application No. 2019-030136.
European Examination Report dated Jul. 6, 2022 in a European patent application No. 20156586.8.

* cited by examiner

FIG. 2
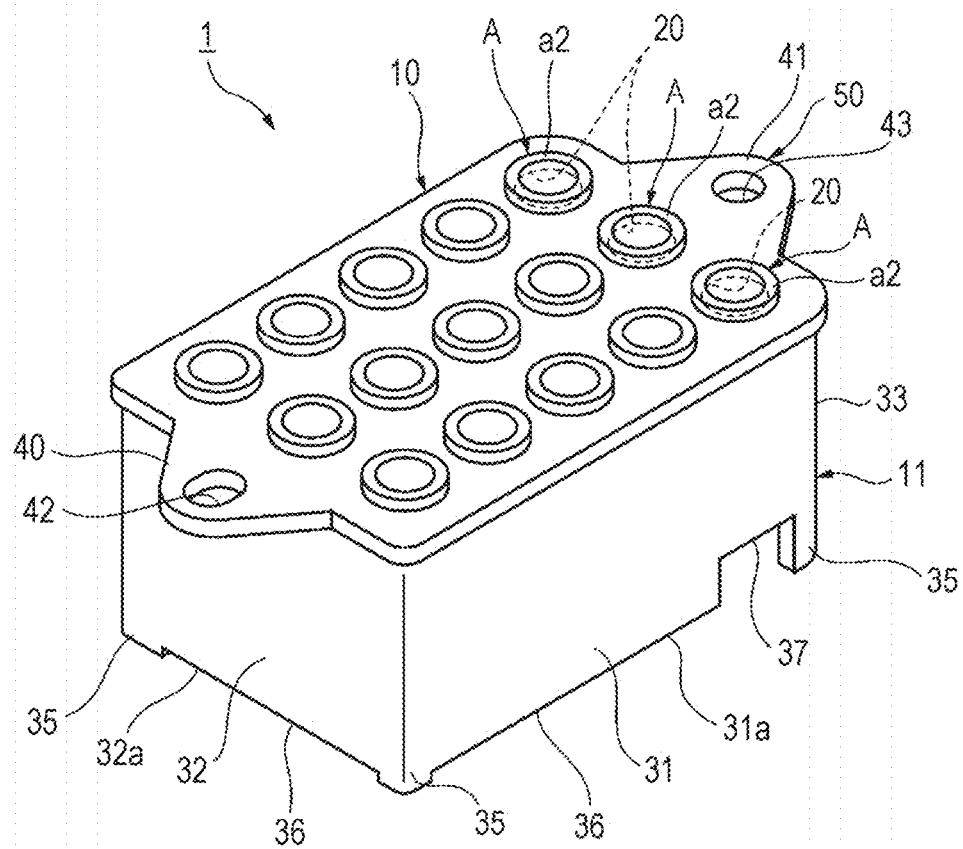
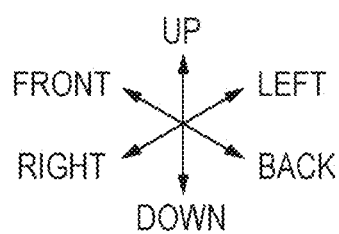

FIG. 6
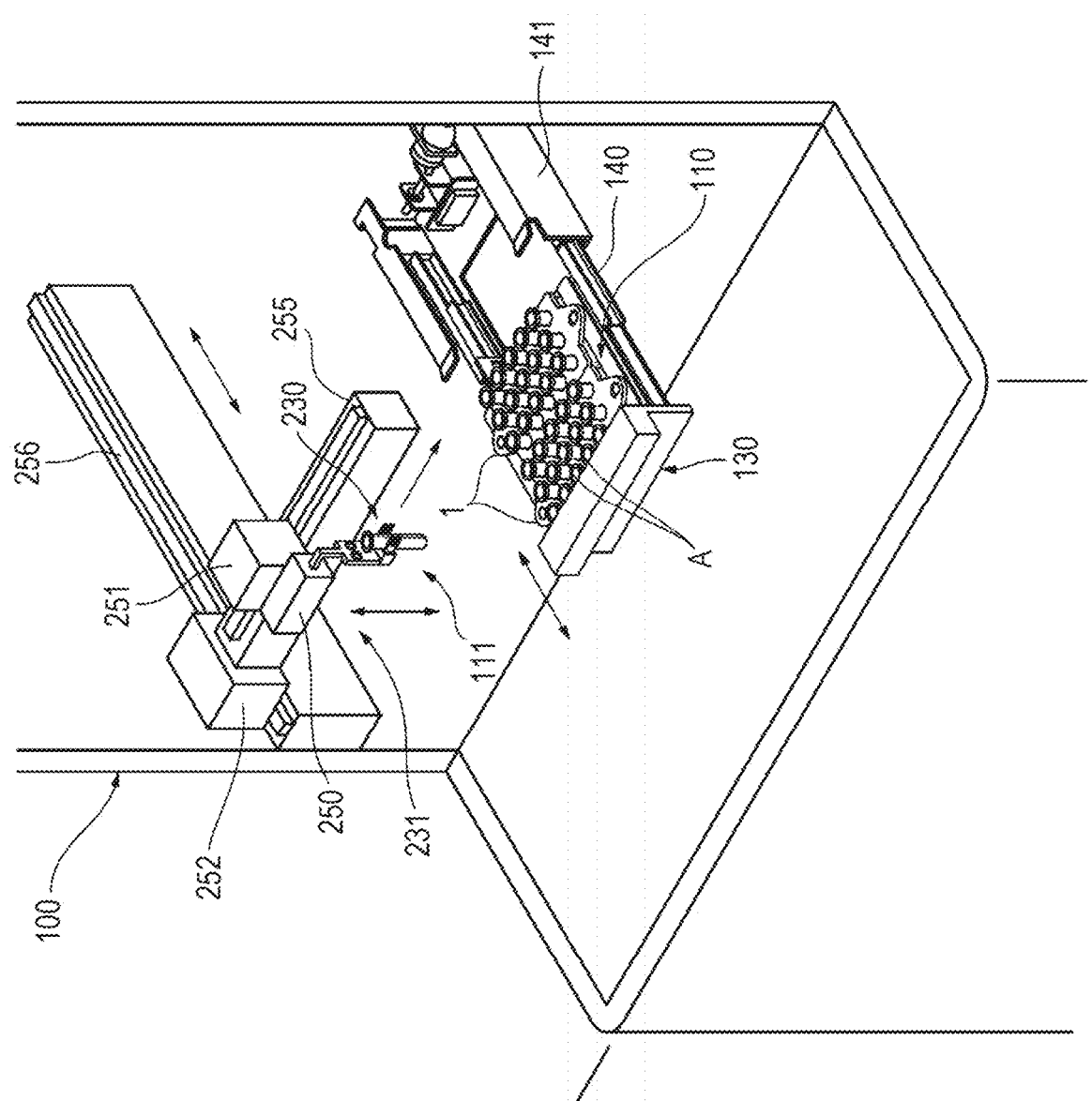
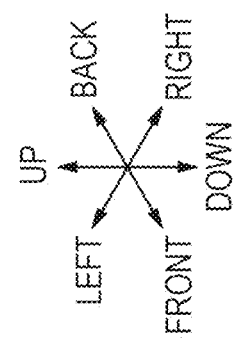

CONTAINER RACK, SPECIMEN ANALYSIS DEVICE, AND SPECIMEN ANALYSIS METHOD

RELATED APPLICATIONS

This application claims priority to Japanese Patent Application No. 2019-030136, filed on Feb. 22, 2019, entitled "Container Rack, Specimen Analysis Device, and Specimen Analysis Method," the entire content of which is incorporated herein by reference.

BACKGROUND OF THE INVENTION

1. Field of the Invention

The present invention relates to a container rack, a specimen analysis device, and a specimen analysis method.

2. Description of the Related Art

Blood analysis such as blood coagulation analysis and blood immunoassay is normally performed by using a specimen analysis device. In this specimen analysis device, generally, a container rack that holds a plurality of empty containers is installed in a rack installation portion. The containers in the container rack are taken out by a conveyance arm. The containers are conveyed to a specimen injection portion. The specimen is injected into the containers in the specimen injection portion. Thereafter, the containers are conveyed to the analysis portion, and the specimen is analyzed.

Examples of the container rack described above include those disclosed in Japanese Patent Application Publication No. H11-326342 A. The container rack in Japanese Patent Application Publication No. H11-326342 A is attachable to and detachable from the specimen analysis device. The container rack in Japanese Patent Application Publication No. H11-326342 A includes, as shown in FIG. 22, a holding plate 702 for holding the head portion of the chip (container) 700 inserted from a insertion port 701 and a box-shaped base plate 703 that supports the holding plate 702.

However, since the above-described container rack supports only the head portion of the chip 700 inserted from the insertion port 701, the container may be shaken or displaced in the specimen analysis device. In this case, since there is a possibility that the conveyance arm may fail to grasp the container in the specimen analysis device, the conveyance of the container is unstable.

Thus, the container rack disclosed in U.S. Patent Application Publication No. 2019070573 A includes a support portion 800 that supports the bottom of the container as shown in FIG. 23.

However, when the container rack includes the support portion 800 that supports the bottom of the container, the number of parts increases and the structure becomes complicated, so the cost of the container rack increases. Since the support portion 800 determines the height of the container when the container is carried into the specimen analysis device, dimensional accuracy is required, and the cost of the container rack is also increased in this respect. In particular, when it is desired to make the container rack disposable, this cost becomes a serious problem.

SUMMARY OF THE INVENTION

The scope of the present invention is defined solely by the appended claims, and is not affected to any degree by the statements within this summary.

As shown in FIGS. 1 and 6, the container rack (1) according to a first aspect of the present invention is the container rack (1) configured to hold a plurality of containers (A), and the container rack (1) is configured to be installed in a rack installation portion (110) of a specimen analysis device (100), the container rack (1) including a holding portion (10) including a plurality of holding holes (20) through which body portions of the containers (A) pass and which hold head portions of the containers (A); and a leg portion (11) configured to support the holding portion (10), the leg portion (11) provided from the holding portion (10) to below the containers (A) held in the holding holes (20). The leg portion (11) is configured such that containers (A) in the holding holes (20) are exposed in a bottom view. The container rack (1) is configured such that when the container rack (1) is installed in the rack installation portion (110) of the specimen analysis device (100), movement of the containers (A) held in the holding holes (20) is restricted by the rack installation portion (110).

According to the present aspect, the container rack (1) includes the holding portion (10) and the leg portion (11), the leg portion (11) is configured such that the container (A) in the holding hole (20) is exposed in a bottom view, and when the container rack (1) is installed in the rack installation portion (110) of the specimen analysis device (100), the container (A) held in the holding hole (20) is restricted in movement by the rack installation portion (110). As a result, the container rack (1) has a simple structure and does not require high dimension accuracy, so that the cost of the container rack (1) can be reduced. The shaking and displacement of the container (A) of the container rack (1) in the specimen analysis device (100) can be reduced.

As shown in FIGS. 6 and 11, the container rack (1) may be configured such that when the container rack (1) is installed in the rack installation portion (110) of the specimen analysis device (100), the container (A) held in the holding hole (20) is inserted into the insertion hole (170) provided for each container (A) of the rack installation portion (110), and the movement of the container (A) is restricted.

According to the present aspect, the shaking and displacement of the container (A) of the container rack (1) in the specimen analysis device (100) can be effectively reduced.

As shown in FIGS. 6 and 9, the container rack (1) may be configured such that when the container rack (1) is installed in the rack installation portion (110) of the specimen analysis device (100), the bottom of the container (A) held in the holding hole (20) is supported by the base (160, 161) of the rack installation portion (110), and the movement of the container (A) is restricted.

According to the present aspect, the shaking and displacement of the container (A) of the container rack (1) in the specimen analysis device (100) can be properly reduced.

As shown in FIG. 9, the container rack (1) may be configured such that the container (A) is pushed upward relative to the holding hole (20) when the bottom of the container (A) is supported by the base (160, 161) of the rack installation portion (110).

As shown in FIG. 6, according to the present aspect, the conveyance unit (111) of the specimen analysis device (100) can easily hold the container (A) from the side, and the container (A) can be held and conveyed stably.

As shown in FIGS. 6 and 9, the container rack (1) may be configured such that when the container rack (1) is installed in the rack installation portion (110) of the specimen analysis device (100), the leg portion (11) is supported by the rack installation portion (110).

According to the present aspect, the container rack (1) can be stably installed in the rack installation portion (110).

As shown in FIGS. 6 and 19, the leg portion (11) may be configured to be fitted and supported by the rack installation portion (110) when the leg portion (11) is in a specific direction with respect to the rack installation portion (110) of the specimen analysis device (100), and the leg portion (11) may be configured not to be fitted and supported by the rack installation portion (110) when the leg portion (11) is in a direction other than the specific direction.

According to the present aspect, the user can easily install the container rack (1) in the rack installation portion (110) without making a mistake in the direction of the container rack (1).

As shown in FIGS. 1 and 3, the leg portion (11) may include side walls (30 to 33) surrounding the periphery of the lower space (C) of the holding portion (10).

As shown in FIGS. 1 and 6, according to the present aspect, the leg portion (11) can stably support the holding portion (10) of the container rack (1). As a result, the position of the container (A) in the specimen analysis device (100) is stabilized, and the conveyance of the container (A) by the conveyance unit (111) can be stabilized.

As shown in FIGS. 1, 2, and 6, the side walls (30 to 33) have side wall lower portions (30a to 33a) uneven in the up-down direction. The side wall lower portions (30a to 33a) may be configured such that when the container rack (1) is installed in the rack installation portion (110) of the specimen analysis device (100), only the downward protruding portion (35) is in contact with and supported by the rack installation portion (110).

According to the present aspect, the area where the leg portion (11) is in contact with the rack installation portion (110) is reduced, so that when the container rack (1) is installed in the rack installation portion (110), rattling of the container rack (1) can be reduced. As a result, the conveyance of the container (A) in the specimen analysis device (100) by the conveyance unit (111) can be stabilized. Since it is sufficient to consider only the dimensional accuracy of the protruding portion (35), the cost of the container rack (1) can be reduced.

As shown in FIGS. 1 and 21, an upper surface of the holding portion (10) may include a fitting portion (660) configured to fit into a downward protruding portion (35) of side wall lower portions (30a to 33a) of another container rack (1) having the identical configuration.

According to the present aspect, a plurality of container racks (1) can be stacked by using the downward protruding portion (35) of the side wall lower portions (30a to 33a).

As shown in FIGS. 1 and 2, the container rack (1) may further include a rack positioning unit (50) for positioning the container rack (1) with respect to the rack installation portion (110) of the specimen analysis device (100).

As shown in FIGS. 1 and 6, according to the present aspect, the container rack (1) can be fixed at a desired position with respect to the rack installation portion (110), and as a result, the conveyance of the container (A) in the specimen analysis device (100) by the conveyance unit (111) can be stabilized.

As shown in FIGS. 1 and 8, the rack positioning unit (50) may include projecting portions (40) and (41) respectively protruding from the holding portion (10) to the left and right, and fastening portions (42) and (43) provided in the projecting portions (40) and (41) and fastened to the fastened portions (200) and (201) of the rack installation portion (110) of the specimen analysis device (100).

According to the present aspect, the container rack (1) can be suitably positioned.

As shown in FIG. 5, the fastening portion (42) of one of the left and right projecting portions (40) may have an elongated hole and the fastening portion (43) of the other projecting portion (41) may have a round hole.

As shown in FIG. 19, according to the present aspect, the container rack (1) can be positioned with a simple structure. Changing the shape of the left and right holes allows the container rack (1) to be installed always in a fixed direction with respect to the rack installation portion (110).

As shown in FIGS. 1, 6, 11, and 15, a specimen analysis device (100) according to a second aspect of the present invention is a specimen analysis device (100) configured to analyze a specimen accommodated in a container (A), the specimen analysis device (100) including a rack installation portion (110) configured to install a container rack (1), the container rack (1) including a holding portion (10) including a plurality of holding holes (20) through which body portions of the containers (A) pass and which hold head portions of the containers (A), and a leg portion (11) configured to support the holding portion (10), the leg portion (11) provided from the holding portion (10) to below the containers (A) held in the holding holes (20); and an analysis unit (471) configured to analyze a specimen accommodated in a container (A) conveyed from a container rack (1) of the rack installation portion (110). The rack installation portion (110) includes a container restriction portion (172) configured to restrict movement of the container (A) held in the holding hole (20) of the container rack (1).

According to the present aspect, the movement of the container (A) held in the holding hole (20) of the container rack (1) can be restricted by the container restriction portion of the rack installation portion (110). As a result, it is possible to reduce shaking and displacement of the container (A) of the container rack (1) in the specimen analysis device (100) by using the container rack (1) with a simple structure and low cost. Analyzing the specimen includes not only the case of analyzing the specimen as it is, but also the case of analyzing by mixing the specimen and the reagent.

As shown in FIG. 6, the specimen analysis device (100) may further include a conveyance unit (111) that holds and conveys the container (A) of the container rack (1) of the rack installation portion (110).

As shown in FIG. 11, the container restriction portion (172) may include an insertion hole (170) into which the container (A) held in the container rack (1) of the rack installation portion (110) is inserted for each container (A).

As shown in FIG. 6, according to the present aspect, the shaking and displacement of the container (A) of the container rack (1) in the specimen analysis device (100) can be effectively reduced.

As shown in FIG. 11, the container restriction portion (172) may include a base (160, 161) that supports the bottom of the container (A) held in the container rack (1) of the rack installation portion (110).

As shown in FIG. 6, according to the present aspect, the shaking and displacement of the container (A) of the container rack (1) in the specimen analysis device (100) can be properly reduced.

As shown in FIGS. 6 and 11, the base (160, 161) may be configured such that when the base (160, 161) supports the bottom of the container (A), the container (A) is pushed upward relatively to the holding hole (20).

As shown in FIG. 6, according to the present aspect, the conveyance unit (111) of the specimen analysis device (100)

can easily hold the container (A) from the side, and the container (A) can be held and conveyed stably.

As shown in FIG. 9, the rack installation portion (110) may further include a rack support portion (154) that supports the leg portion (11) of the container rack (1).

According to the present aspect, the container rack (1) can be stably installed in the rack installation portion (110).

As shown in FIG. 9, the rack support portion (154) may be configured such that the rack support portion (154) fits and supports the leg portion (11) of the container rack (1) in a specific direction, and cannot fit and support the leg portion (11) in a direction other than the specific direction.

According to the present aspect, the user can easily install the container rack (1) in the rack installation portion (110) without making a mistake in the direction of the container rack (1).

As shown in FIGS. 6 and 8, the specimen analysis device (100) may further include rack positioning units (200) and (201) for positioning the container rack (1) of the rack installation portion (110).

As shown in FIGS. 6 and 11, according to the present aspect, the container rack (1) can be fixed at a desired position with respect to the rack installation portion (110), and as a result, the conveyance of the container (A) in the specimen analysis device (100) by the conveyance unit (111) can be stabilized.

As shown in FIGS. 6 and 8, the specimen analysis device (100) may further include frames (190) and (191) on both the left and right sides across the rack installation portion (110), and the rack positioning units (200) and (201) may be provided on the frames (190) and (191).

As shown in FIG. 11, according to the present aspect, the container rack (1) can be suitably positioned.

As shown in FIGS. 6 and 7, the specimen analysis device (100) may include a rack installation portion (110), and may further include a drawer portion (130) that allows the rack installation portion (110) to be taken in and out of a device housing (120).

According to the present aspect, the container rack (1) in the specimen analysis device (100) can be suitably replaced.

As shown in FIGS. 7 and 8, the specimen analysis device (100) may include a sensor (142) for detecting at least any one of the rack installation portion (110) of the drawer portion (130) being pulled out of the device housing (120) and the rack installation portion (110) of the drawer portion (130) being accommodated in the device housing (120).

According to the present aspect, by using the detection result of the sensor (142), it is possible to grasp that the container rack (1) is under replacement or that replacement of the container rack (1) is finished, for example.

As shown in FIGS. 7 and 8, the specimen analysis device (100) may further include a lock mechanism (143) that fixes and releases the state in which the rack installation portion (110) of the drawer portion (130) is accommodated in the device housing (120).

According to the present aspect, it is possible to prevent the drawer portion (130) from being pulled out during operation of the specimen analysis device (100), for example.

As shown in FIGS. 6 and 10, the specimen analysis device (100) may further include a container detection sensor (180) that detects the presence of the container (A) in the specific holding hole (20) of the container rack (1) of the rack installation portion (110).

According to the present aspect, since the holding state of the container (A) of the container rack (1) can be grasped, it can be detected that the container rack (1) has been replaced, for example.

As shown in FIGS. 13 and 17, the specimen analysis device (100) may further include a display unit (263) that displays the number of containers (A) remaining in the container rack (1) of the rack installation portion (110).

As shown in FIG. 17, according to the present aspect, the user can be notified of the remaining number of containers (A) in the container rack (1).

As shown in FIGS. 1, 6, and 15, a specimen analysis method according to a third aspect of the present invention includes a specimen analysis method for analyzing a specimen accommodated in a container (A), the specimen analysis method including a first step of installing a container rack (1) in a rack installation portion (110) of a specimen analysis device (100), and restricting movement of the container (A) in the container rack (1) with the rack installation portion (110), the container rack (1) including a holding portion (10) including a plurality of holding holes (20) through which body portions of the containers (A) pass and which hold head portions of the containers (A), and a leg portion (11) configured to support the holding portion (10), the leg portion (11) provided from the holding portion (10) to below the containers (A) held in the holding holes (20); and a second step of conveying the container (A) to an analysis unit (471) and analyzing a specimen in the container (A).

According to the present aspect, the movement of the container (A) of the container rack (1) installed in the rack installation portion (110) can be restricted. As a result, it is possible to reduce shaking and displacement of the container (A) of the container rack (1) in the specimen analysis device (100) by using the container rack (1) with a simple structure and low cost.

As shown in FIGS. 6, 15, and 16, the specimen analysis method may further include a second step of holding and conveying the container (A) of the container rack (1).

As shown in FIG. 19, the first step may include a step in which the container (A) held in the container rack (1) is inserted into the insertion hole (170) for each container (A).

As shown in FIGS. 6 and 19, according to the present aspect, it is possible to effectively reduce shaking and displacement of the container (A) of the container rack (1) in the specimen analysis device (100).

As shown in FIG. 11, the first step may include a step of supporting the bottom of the container (A) held in the container rack (1) on the base (160, 161).

As shown in FIGS. 6 and 11, according to the present aspect, the shaking and displacement of the container (A) of the container rack (1) in the specimen analysis device (100) can be properly reduced.

As shown in FIGS. 19 and 20, the first step may include a step of pushing the container (A) upward relatively to the holding hole (20) when the base (160, 161) support the bottom of the container (A).

As shown in FIG. 6, according to the present aspect, the conveyance unit of the specimen analysis device (100) can easily hold the container (A), and the container (A) can be conveyed stably.

As shown in FIG. 9, the first step may include a step in which the rack installation portion (110) supports the leg portion (11) of the container rack (1).

According to the present aspect, the container rack (1) can be stably installed in the rack installation portion (110).

As shown in FIGS. 19 and 20, the specimen analysis method may further include a step of positioning the container rack (1) with respect to the rack installation portion (110).

As shown in FIG. 6, according to the present aspect, the container rack (1) can be fixed at a desired position with respect to the rack installation portion (110), and as a result, the conveyance of the container (A) in the specimen analysis device (100) by the conveyance unit (111) can be stabilized.

As shown in FIGS. 6 and 7, the specimen analysis method may further include a step in which the drawer portion (130) including the rack installation portion (110) is taken in and out of the device housing (120), and in the first step, the container rack (1) may be installed in the rack installation portion (110) of the pulled out drawer portion (130).

According to the present aspect, the container rack (1) in the specimen analysis device (100) can be suitably replaced.

As shown in FIGS. 7 and 8, the specimen analysis method may further include a step of the sensor (142) detecting at least any one of the drawer portion (130) being pulled out of the device housing (120) and the drawer portion (130) being accommodated in the device housing (120).

According to the present aspect, by using the detection result of the sensor (142), it is possible to grasp that the user is under replacement of the container rack (1) or that the user has finished replacement of the container rack (1), for example.

As shown in FIG. 10, the specimen analysis method may further include a step of the container detection sensor (180) detecting the presence or absence of the container (A) in the specific holding hole (20) of the container rack (1) of the rack installation portion (110).

According to the present aspect, it is possible to reliably check that the container rack (1) has been replaced.

As shown in FIGS. 6, 13, and 17, the specimen analysis method may further include a step of displaying the number of containers (A) remaining in the container rack (1) of the rack installation portion (110) on the display unit (263).

As shown in FIG. 17, according to the present aspect, the user can be notified of the remaining number of containers (A) in the container rack (1).

According to the present invention, it is possible to provide a container rack that is low-cost while reducing shaking and displacement of a container in a specimen analysis device, a specimen analysis device in which the container rack can be installed, and a specimen analysis method using the container rack.

BRIEF DESCRIPTION OF THE DRAWINGS

FIG. 2 is a perspective view of the container rack as viewed from the back side;

FIG. 6 is a schematic diagram showing an outline of a configuration of a rack installation portion and a conveyance unit of a specimen analysis device;

DETAILED DESCRIPTION OF THE PREFERRED EMBODIMENTS

Figure 1:
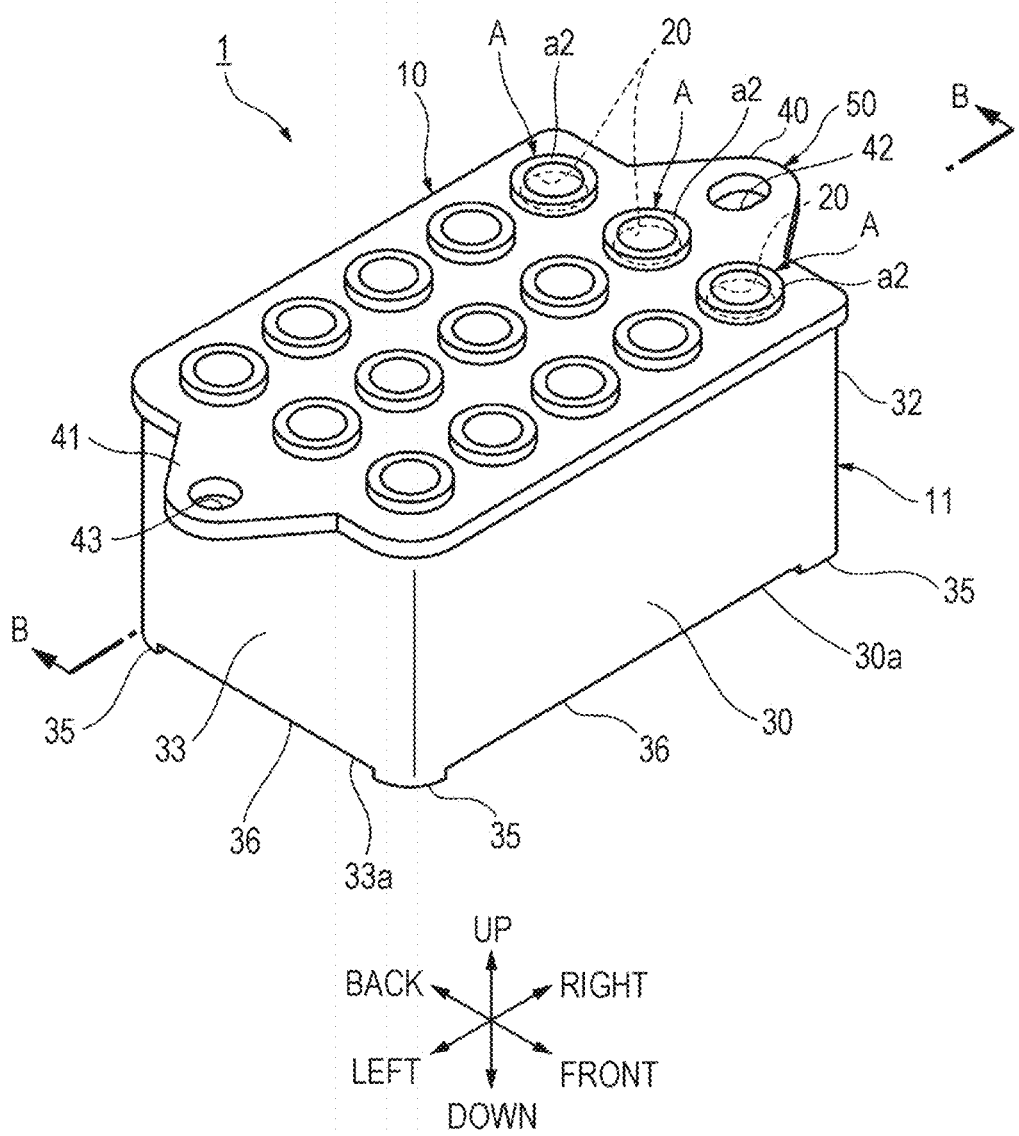
FIG. 1 is a perspective view of a container rack as viewed from the front side.

Hereinafter, preferred embodiments will be described with reference to the drawings. The same reference numerals denote the same elements, and duplicate descriptions are omitted. The positional relationship such as up, down, left, and right is based on the positional relationship shown in the drawings unless otherwise noted. The dimensional ratios in the drawings are not limited to the illustrated ratios. The following embodiment is exemplification for describing the present disclosure, and the present disclosure is not limited to this embodiment.

In the present embodiment, a container rack that holds a container for accommodating a specimen, and a system including a specimen analysis device that analyzes an analysis sample in which a specimen accommodated in the container of the container rack and a reagent are mixed will be described.

<Container Rack>

Figure 3:
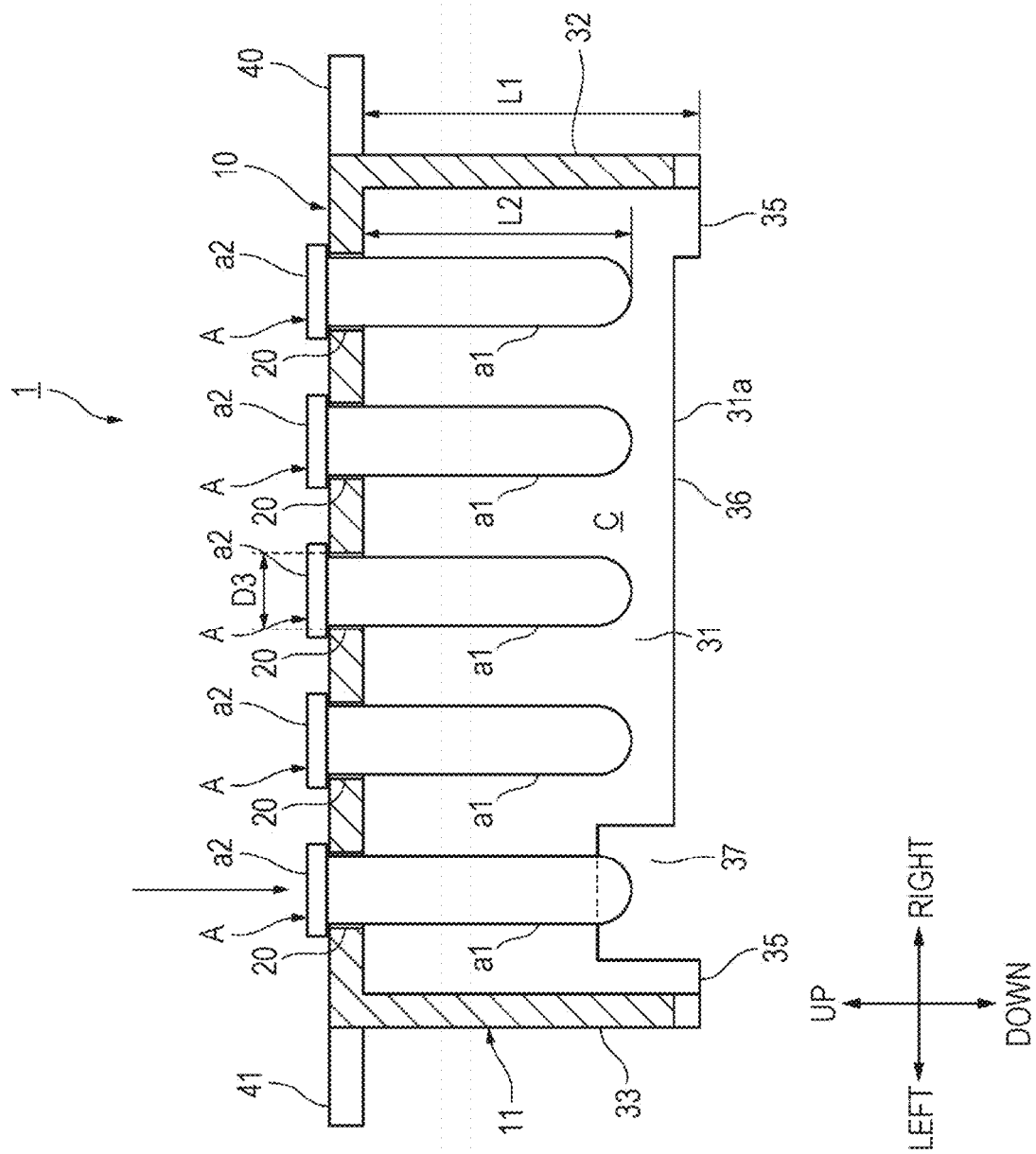
FIG. 3 is a cross-sectional view of the container rack taken along line B-B in FIG. 1.

FIG. 1 is a perspective view showing an example of an appearance of a container rack 1 holding containers A as viewed from the front side. FIG. 2 is a perspective view showing an example of an appearance of the container rack 1 holding the containers A as viewed from the back side. FIG. 3 is a longitudinal cross-sectional view of the container rack 1 taken along line B-B in FIG. 1.

The container rack 1 is made of paper or resin. The container rack 1 is disposable. The container rack 1 includes a plate-shaped holding unit 10 and a wall-shaped leg portion 11 provided downward from the lower surface of the holding portion 10. Herein, "up" means the "up" at the time of an attitude in which the container rack 1 is normally used as shown in FIGS. 1 to 3, that is, at the time of an attitude in which the holding portion 10 of the container rack 1 is set upward and the leg portion 11 is set downward, and "down" means the "down" at the time of an attitude in which the container rack 1 is normally used.

The holding portion 10 has a rectangular shape. The holding portion 10 includes a plurality of holding holes 20 penetrating vertically. In the left-right direction along the long side of the holding portion 10 and in the front-back direction along the short side, the plurality of holding holes 20 are formed to be arranged in a plurality of rows (for example, 5 rows in the left-right direction and 3 rows in the front-back direction).

Figure 4:
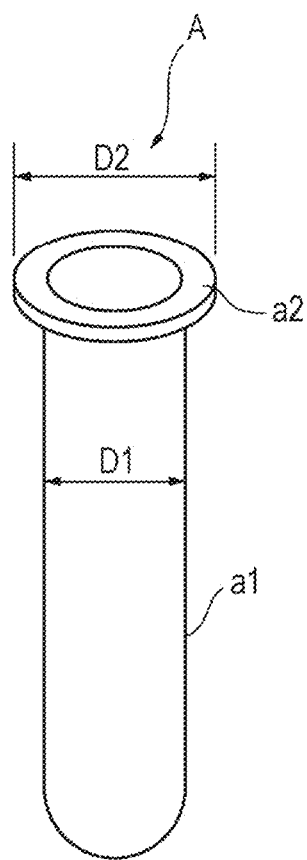
FIG. 4 is a perspective view of a container.

As shown in FIG. 3, the holding hole 20 has a hole diameter through which a body portion a1 of the container A is allowed to pass and which holds a head portion a2 of the container A. That is, as shown in FIG. 4, the container A includes the body portion a1 that accommodates liquid and the head portion a2 provided near the inlet of the body portion a1. The head portion a2 is formed in a flange shape that protrudes radially outward from the upper portion of the body portion a1. The head portion a2 has an outer circumferential outer diameter D2 larger than the outer circumferential outer diameter D1 of the body portion a1. Then, as shown in FIG. 3, the holding hole 20 has a hole diameter D3 slightly larger than the outer circumferential outer diameter D1 of the body portion a1 of the container A and smaller than the outer circumferential outer diameter D2 of the head portion a2. The hole diameter D3 of the holding hole 20 has only to be a diameter into which the body portion a1 of the container A can be inserted. The hole diameter D3 of the holding hole 20 is preferably as close as possible to the outer circumferential outer diameter D1 of the body portion a1.

Figure 5:
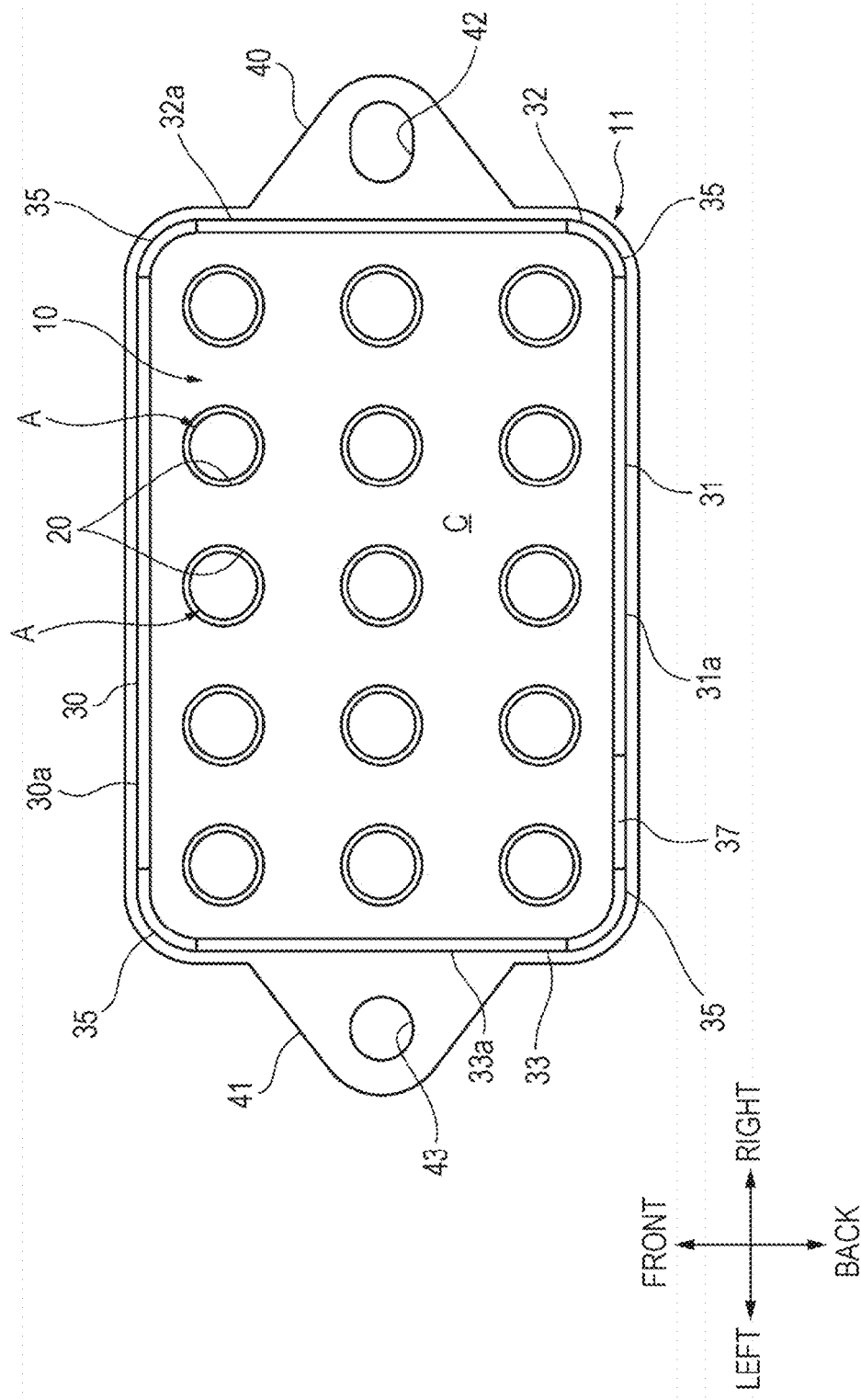
FIG. 5 is a bottom view of a container rack holding containers.

As shown in FIGS. 1 to 3 and 5, the leg portion 11 includes side walls 30, 31, 32, and 33 that surround the four sides of the lower space C of the holding portion 10. As shown in FIG. 5, the lower surface of the container rack 1 is not covered and is open. The container A held in the holding hole 20 is exposed as viewed from the lower surface. The side wall 30 is a side wall on the front side. The side wall 31 is a side wall on the back side. The side wall 32 is a side wall on the right side. The side wall 33 is a side wall on the left side.

As shown in FIG. 3, the leg portion 11 extends below the container A held in the holding hole 20. That is, the length L1 of the leg portion 11 is longer than the length L2 of the portion protruding downward from the holding portion 10 of the body portion a1 of the container A.

As shown in FIGS. 1 to 3, the side walls 30 to 33 of the leg portion 11 have side wall lower portions 30a to 33a having unevenness in the vertical direction. For example, in the side wall lower portions 30a to 33a at the positions corresponding to the four corners of the leg portion 11, a protruding portion 35 protruding downward is formed. A recessed portion 36 recessed upward is formed between the protruding portions 35. When the container rack 1 is placed on a rack installation portion 110 of the specimen analysis device 100 described below, the protruding portion 35 is in contact with and supported by the rack installation portion. As shown in FIG. 2, for example, in the side wall lower portion 31a of the side wall 31 on the back side, a recessed portion 37 is formed as a notch so as not to interfere with a container detection sensor 180 of the rack installation portion described below.

The holding portion 10 includes projecting portions 40 and 41 protruding in the left-right direction in the longitudinal direction. The projecting portions 40 and 41 have a plate shape that curves convexly outward in the left-right direction, for example. For example, the projecting portion 40 on the right side is formed with a first fastening portion 42 having an elongated hole for positioning the container rack 1 in the rack installation portion 110 described below. The projecting portion 41 on the left side is formed with a second fastening portion 43 having a round hole. In the present embodiment, the projecting portions 40 and 41 and the fastening portions 42 and 43 constitute the positioning portion 50 of the container rack 1.

<Specimen Analysis Device>

FIG. 6 shows an example of a rack installation portion 110 and a conveyance unit 111 inside the specimen analysis device 100. The specimen analysis device 100 shown in FIG. 6 is a device that analyzes an analysis sample obtained by mixing a specimen accommodated in the container A and a reagent. The specimen analysis device 100 includes a rack installation portion 110 that can install the container rack 1 and a conveyance unit 111 that holds and conveys the container A of the container rack 1 installed in the rack installation portion 110.

Figure 7:
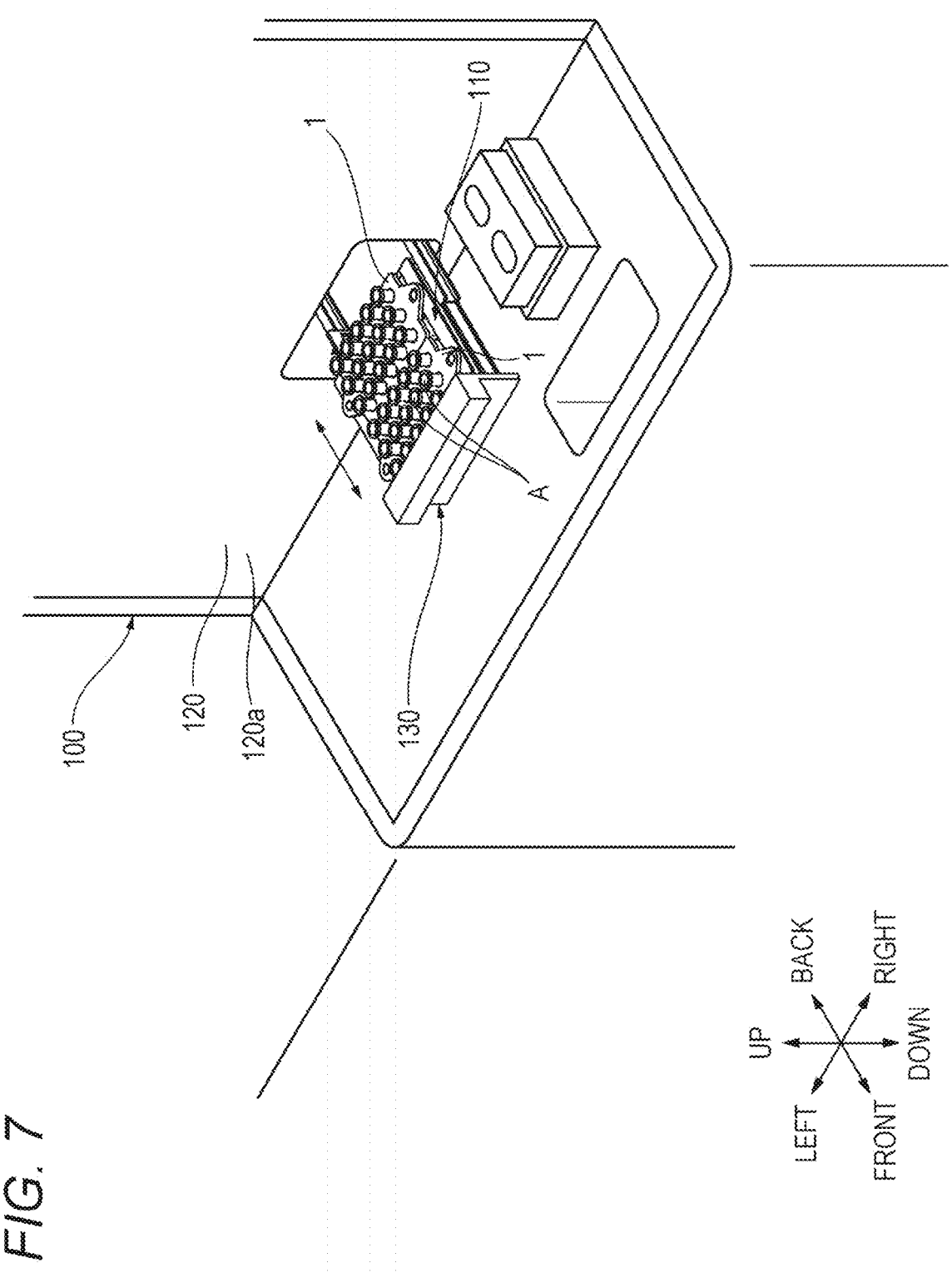
FIG. 7 is an explanatory view showing a state in which a drawer portion is pulled out in the specimen analysis device.

As shown in FIG. 7, the specimen analysis device 100 is covered with a device housing 120. The specimen analysis device 100 has a drawer portion 130 for taking the rack installation portion 110 into and out of the device housing 120 in the front-back direction. The drawer portion 130 can be taken in and out of a front surface portion 120a of the device housing 120.

Figure 8:
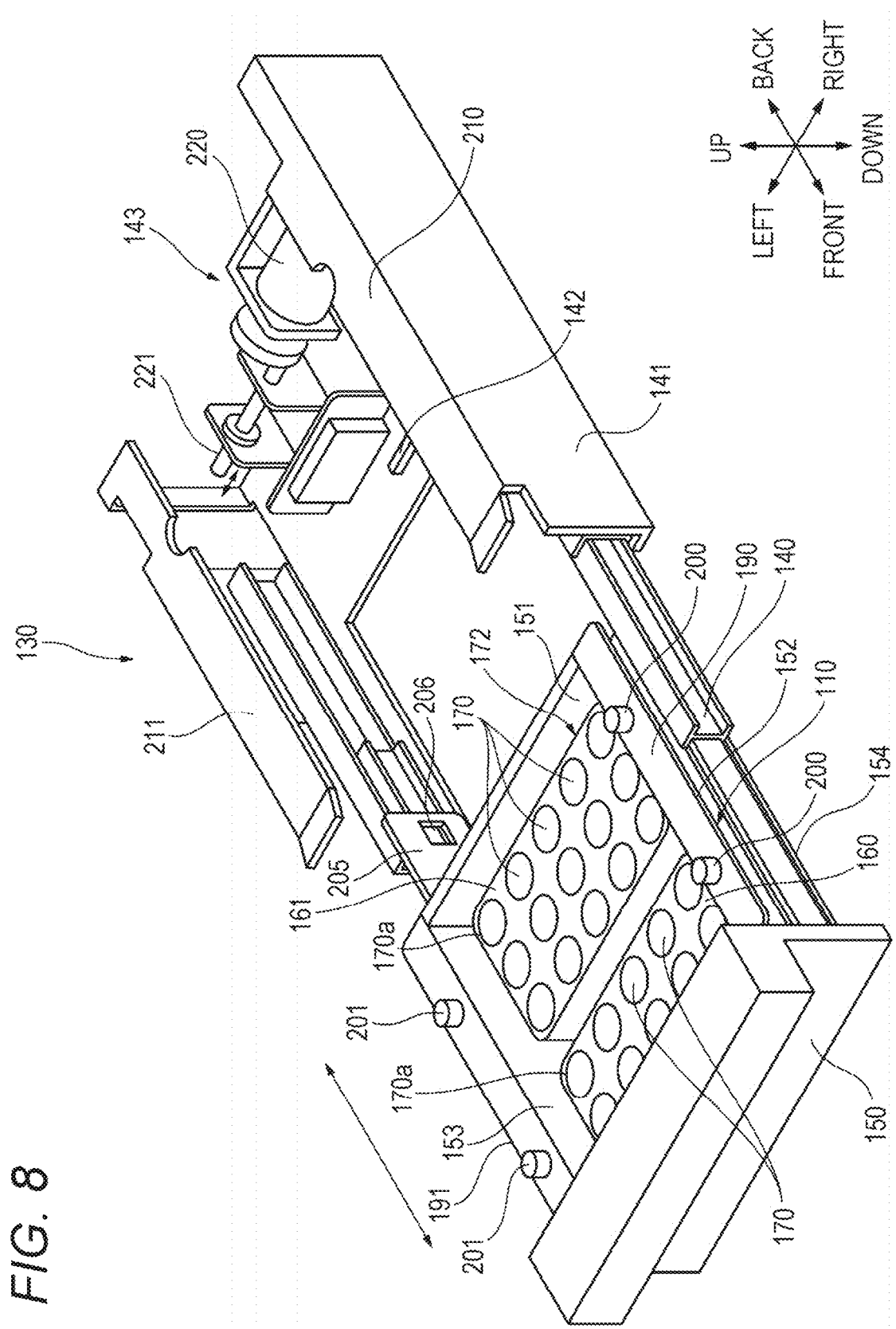
FIG. 8 is a perspective view showing an example of a configuration of a drawer portion.

As shown in FIG. 8, the drawer portion 130 includes a rack installation portion 110, a slide rail 140 that holds the rack installation portion 110, a frame unit 141 that supports the slide rail 140 movably in the front-back direction, a sensor 142, and a lock mechanism 143.

Figure 9:
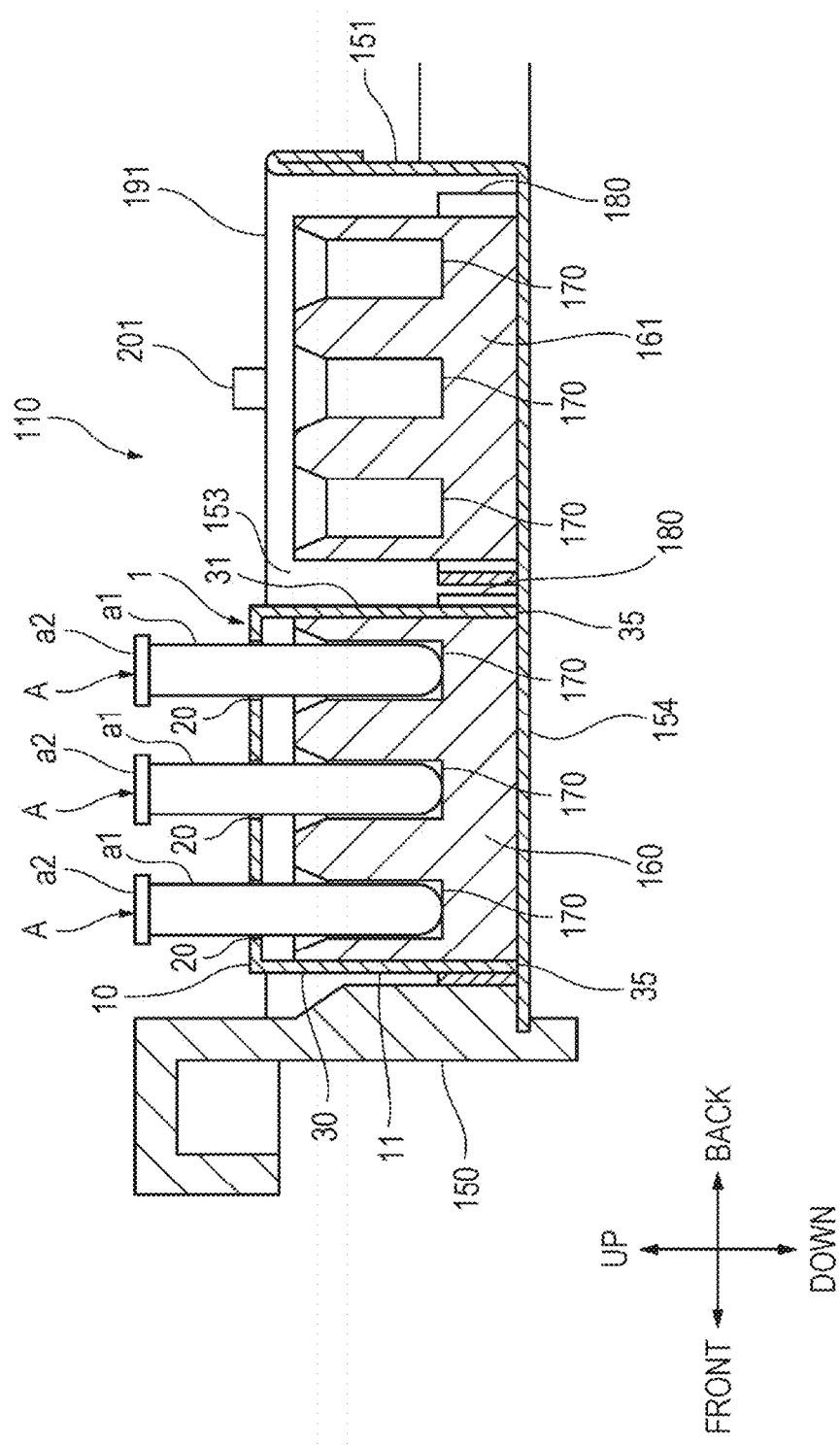
FIG. 9 is a longitudinal sectional view of a configuration of the rack installation portion as viewed from the left-right direction.

As shown in FIGS. 8 and 9, the rack installation portion 110 is formed in a rectangular box shape. The rack installation portion 110 has side walls 150, 151, 152, and 153 surrounding the four sides, and a bottom wall 154 as a rack support portion.

The rack installation portion 110 includes two bases 160 and 161 having a rectangular parallelepiped shape on the bottom wall 154 inside thereof. The bases 160 and 161 are arranged in the front-back direction. Hereinafter, since the base 160 and the base 161 have the same configuration, only the configuration of the base 160 will be described, and the description of the base 161 will be omitted.

The shape of the base 160 in a plan view is square the same as that of the opening of the lower surface of the container rack 1. The size of the base 160 in a plan view is slightly smaller than that of the opening of the lower surface of the container rack 1. Therefore, the container rack 1 can be fitted into the base 160 so that the container rack 1 covers the base 160 from above as shown in FIGS. 9 and 10.

Figure 10:
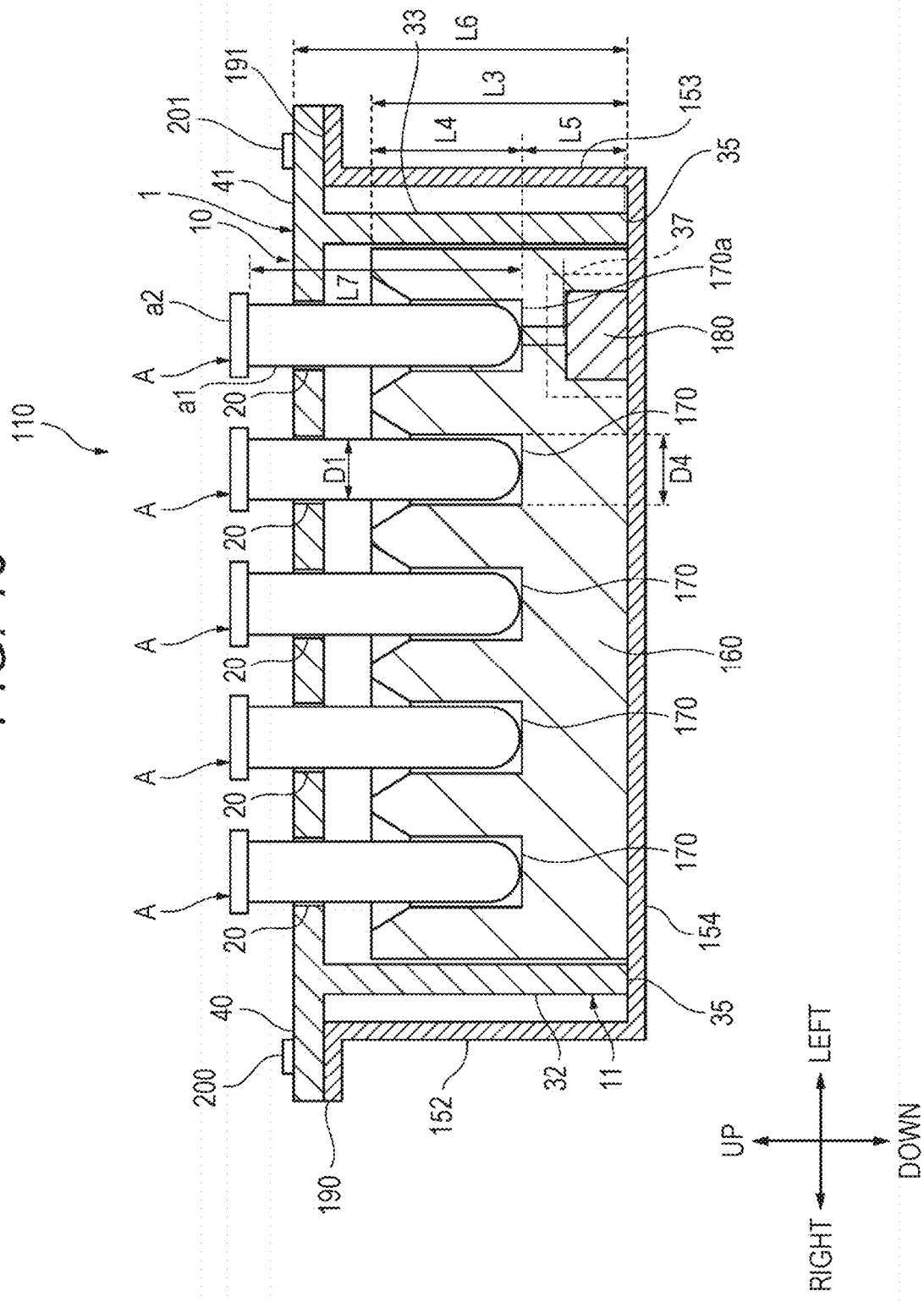
FIG. 10 is a longitudinal sectional view of the configuration of the rack installation portion as viewed from the front-back direction.

As shown in FIG. 10, the length (height) L3 of the base 160 is set lower than the length (height) L1 of the leg portion 11 of the container rack 1. Thus, when the container rack 1 is installed in the rack installation portion 110, the protruding portions 35 at the four corners of the leg portion 11 are supported in contact with, for example, the bottom wall 154 around the base 160. The base 160 may include a rack support portion. The protruding portions 35 at the four corners of the leg portion 11 may be supported by the rack support portion.

As shown in FIGS. 8, 9, and 10, the base 160 has a plurality of insertion holes 170 arranged in the front-back direction and the left-right direction. The insertion hole 170 is formed in a substantially cylindrical shape from the upper surface of the base 160 downward. The number of the insertion holes 170 coincides with the number of, and the arrangement of, the holding holes 20 of the container rack 1. When the container rack 1 is installed in the rack installation portion 110, each container A of the holding hole 20 is inserted into the corresponding insertion hole 170. In the present embodiment, the insertion hole 170 and the bases 160 and 161 constitute a container restriction portion 172.

As shown in FIG. 10, the inner diameter D4 of the insertion hole 170 is slightly larger than the outer diameter D1 of the body portion a1 of the container A. The relationship between the depth L4 of the insertion hole 170 (the height L5 of the bottom surface of the insertion hole 170), the height L6 of the container rack 1, the height L3 of the base 160, and the length L7 of the body portion a1 of the container A is set so that the container A is supported by the bottom surface of the insertion hole 170 and pushed up above the holding hole 20 when the container rack 1 is installed in the rack installation portion 110. For example, the length L7 of the body portion a1 of the container A is set to be longer than the distance (L4+L6−L3) from the upper surface of the holding portion 10 to the bottom surface of the insertion hole 170. Thus, the head portion a2 of the container A protrudes above from the holding portion 10 of the container rack 1.

At the bottom portion of one insertion hole 170a among the plurality of insertion holes 170, a container detection sensor 180 for detecting the presence or absence of a container A in the insertion hole 170a is provided. The insertion hole 170a is an insertion hole that the conveyance unit 111 first accesses with respect to the container rack 1 installed on the base 160 as shown in FIG. 8, for example. For example, the insertion hole 170a is an insertion hole positioned on the backmost side and the leftmost side.

The container detection sensor 180 shown in FIG. 10 is a non-contact optical sensor, for example. The container detection sensor 180 applies laser light upward and receives the reflected light, whereby the container detection sensor 180 can detect the presence or absence of the container A. The container detection sensor 180 is provided so as to slightly protrude from the base 160 to the back side as shown in FIG. 9, for example. When the container rack 1 is installed in the rack installation portion 110 as shown in FIG. 10, the container detection sensor 180 is provided at the position of the recessed portion 37 of the side wall 31 of the container rack 1. Interference between the container detection sensor 180 and the container rack 1 is prevented. Since the container detection sensor 180 slightly protrudes from the base 160, if the container rack 1 is to be fitted into the base 160 in the direction opposite to front and back (opposite to left and right), the side wall 30 of the container rack 1 hits the container detection sensor 180, and the container rack 1 does not fit into the base 160 and is not supported. That is, the leg portion 11 of the container rack 1 is configured to be fitted into and supported by the rack installation portion 110 when the leg portion 11 is in a specific direction with respect to the rack installation portion 110 (a direction in which the side wall 30 is on the front side and the side wall 31 is on the back side) and not to be supported without being fitted into the rack installation portion 110 when the leg portion 11 is in a direction other than the specific direction.

Figure 11:
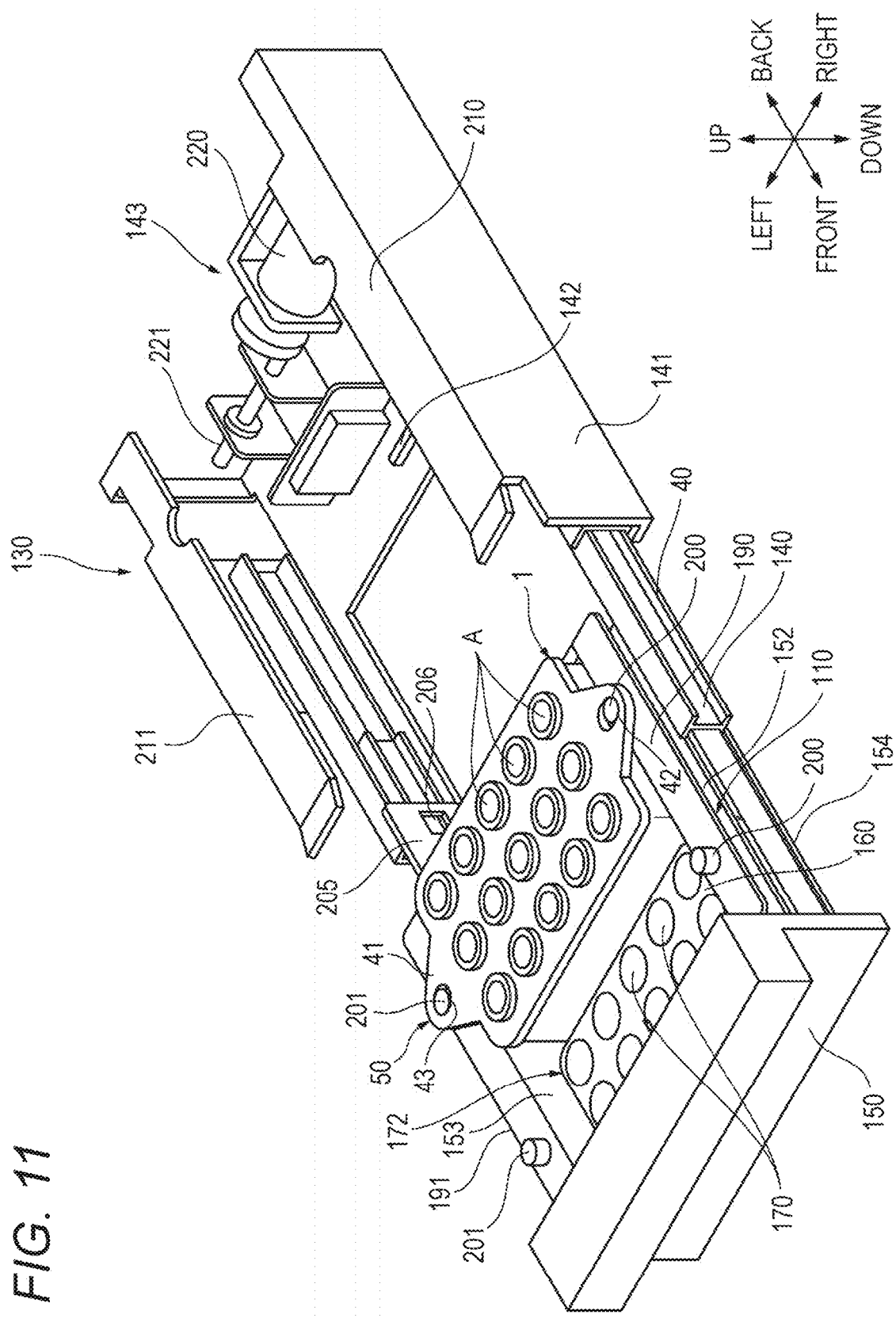
FIG. 11 is an explanatory view showing a state where a container rack is installed in the rack installation portion.

As shown in FIG. 8, frame plates 190 and 191 provided to extend in the front-back direction are provided on upper portions of the side walls 152 and 153 in the left-right direction of the base 160. On the upper surface of the frame plate 190 on the right side, two protrusions 200 as fastened portions and positioning portions are provided. On the upper surface of the frame plate 191 on the left side, two protrusions 201 as fastened portions and positioning portions are provided. When the container rack 1 is installed in the rack installation portion 110 as shown in FIG. 11, the first fastening portion 42 of the elongated hole on the right side of the container rack 1 is fitted into the protrusion 200 of the frame plate 190 on the right side and positioned, and the second fastening portion 43 of the round hole on the left side of the container rack 1 is fitted into the protrusion 201 of the frame plate 191 on the left side and positioned.

As shown in FIG. 8, a protruding plate 205 protruding backward is provided at the end portion on the left side of the side wall 151 in back of the rack installation portion 110. The protruding plate 205 is provided with an opening 206.

The frame unit 141 is fixed to the device housing 120 side. The frame unit 141 includes cover plates 210 and 211 that cover the upper surfaces of the frame plates 190 and 191 when the rack installation portion 110 is accommodated in the frame unit 141 by the slide rail 140, for example.

The sensor 142 is fixed to the frame unit 141. The sensor 142 can detect that the rack installation portion 110 of the drawer portion 130 is pulled out of the device housing 120 and is accommodated in the device housing 120. The sensor 142 is a non-contact optical sensor, for example. The sensor 142 applies laser light frontward and receives the reflected light, whereby the sensor 142 can detect the presence or absence of the accommodation of the rack installation portion 110.

The lock mechanism 143 is fixed to the frame unit 141. The lock mechanism 143 includes a solenoid 220 and a stopper 221 that moves back and forth in the left-right direction by the solenoid 220. When the stopper 221 protrudes, the stopper 221 enters the opening 206 of the protruding plate 205 of the rack installation portion 110, the lock mechanism 143 can fix the rack installation portion 110 to the frame unit 141. When the stopper 221 retreats, the lock mechanism 143 can release the fixation of the rack installation portion 110 to the frame portion 141.

The conveyance unit 111 shown in FIG. 6 includes a holding portion 230 for holding a container A, and a moving mechanism 231 that moves the holding portion 230 in the left-right direction, the front-back direction, and the up-down direction.

Figure 12:
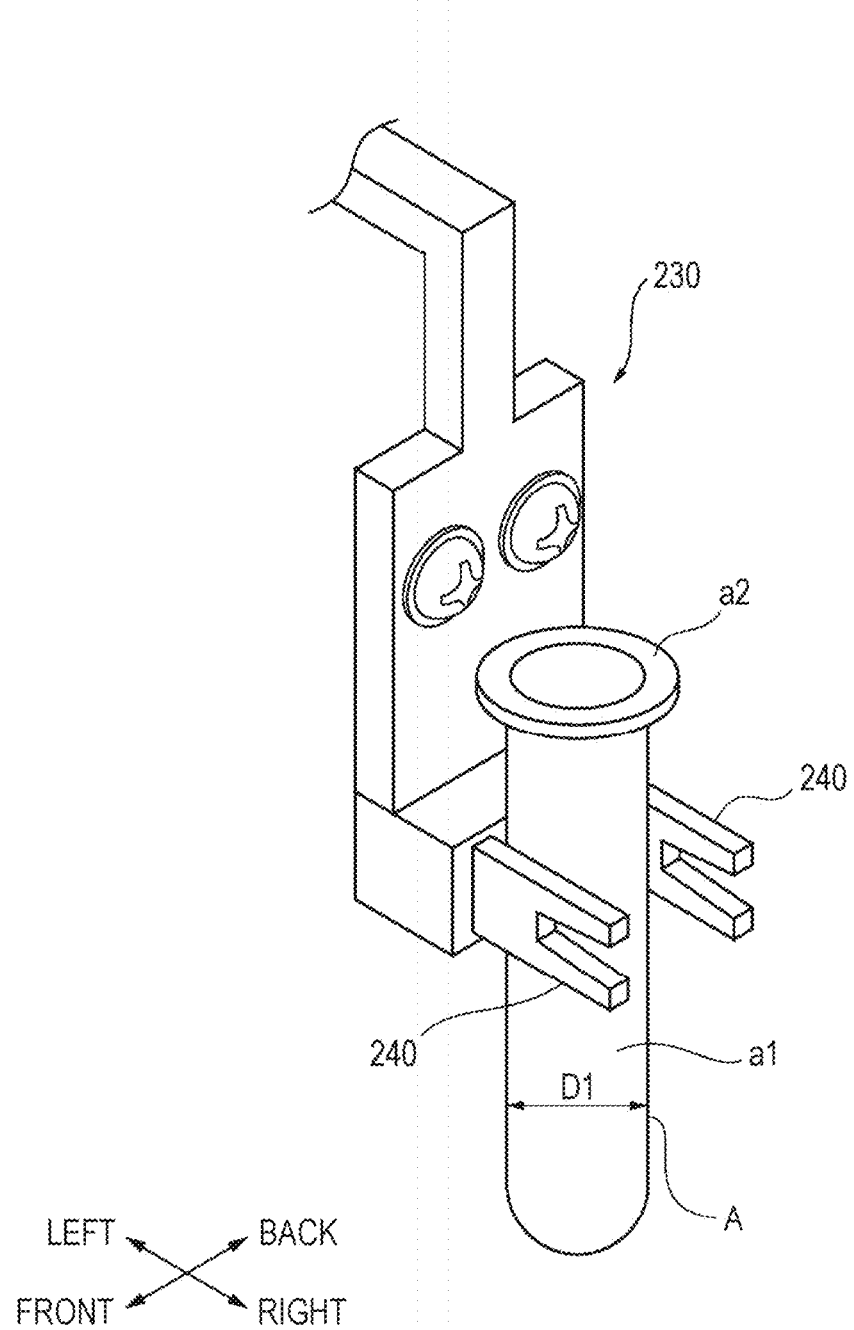
FIG. 12 is a perspective view showing an example of a configuration of a holding portion of the conveyance unit.

As shown in FIG. 12, the holding portion 230 includes two arms 240 extending in parallel in the horizontal direction. The dimension of the gap between the two arms 240 is formed to be approximately the same as the outer circumferential outer diameter D1 of the body portion a1 of the container A. The arm 240 is directed to the right. The arm 240 can access the container A from the left side.

As shown in FIG. 6, for example, the moving mechanism 231 includes an up-down moving unit 250 that holds the holding portion 230 and moves up and down, a left-right moving unit 251 that holds the up-down moving unit 250 and moves along the Y-axis rail 255 extending in the left-right direction, and a front-back moving unit 252 that moves the left-right moving unit 251 along the X-axis rail 256 extending in the front-back direction.

The holding portion 230 accesses the container A of the container rack 1 installed in the rack installation portion 110. The arm 240 supports the body portion a1 of the container A from the left side in the horizontal direction. The holding portion 230 can move the container A to any position in the specimen analysis device 100.

The specimen analysis device 100 including the rack installation portion 110 and the conveyance unit 111 as described above further includes the following configuration, for example.

Figure 13:
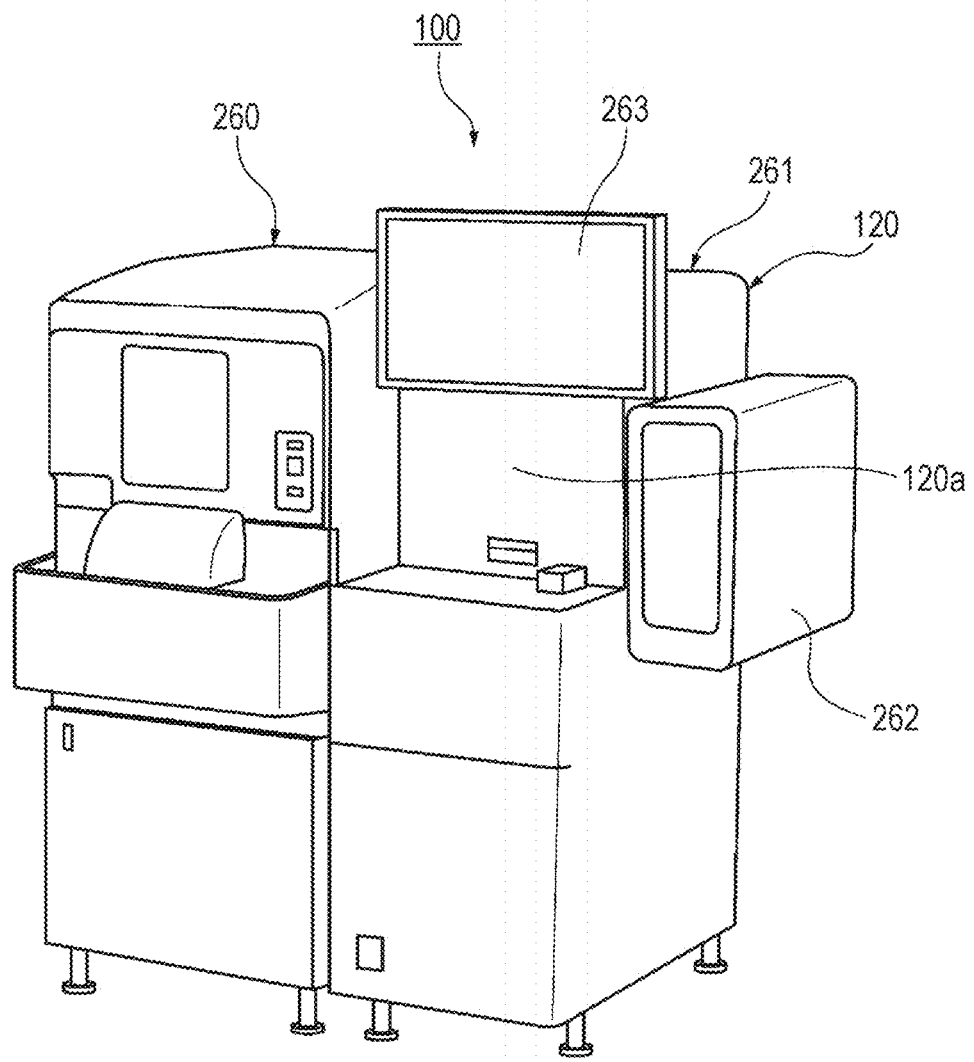
FIG. 13 is a perspective view showing an example of the appearance of a specimen analysis device.

As shown in FIG. 13, the specimen analysis device 100 includes a blood coagulation test unit 260, an immunological test unit 261, a control unit 262, and a display unit 263, for example. The blood coagulation test unit 260 and the immunological test unit 261 are adjacent to each other. For example, the immunological test unit 261 includes the above-described rack installation portion 110 and the conveyance unit 111. The above-described container rack 1 supplies an empty container A to the immunological test unit 261.

<Blood Coagulation Test Unit>

Figure 14:
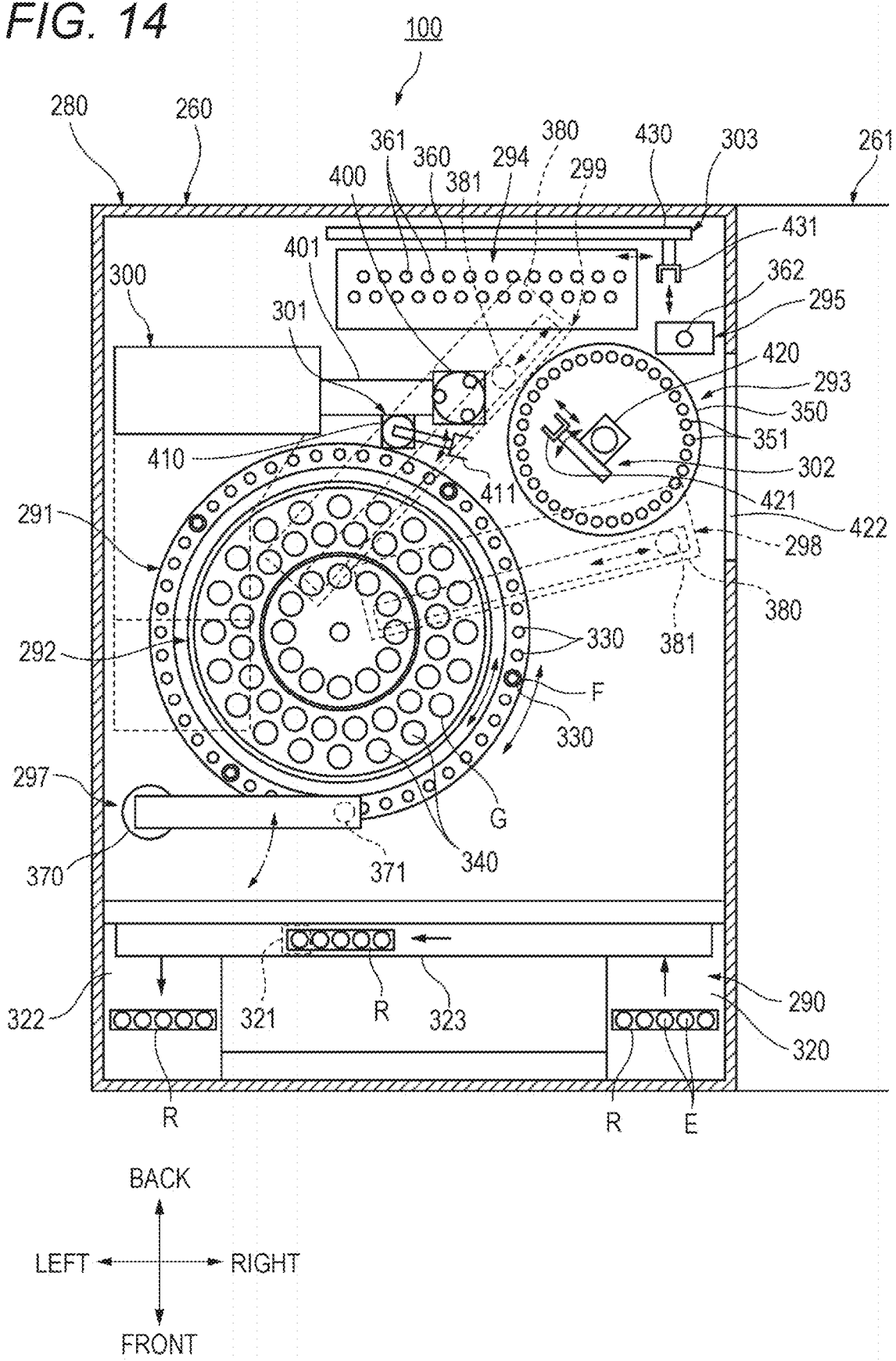
FIG. 14 is an explanatory diagram of a cross section showing an example of the internal configuration of the blood coagulation test unit of the specimen analysis device.

FIG. 14 is a schematic diagram showing an internal configuration of the blood coagulation test unit 260.

The blood coagulation test unit 260 automatically performs analysis related to the blood coagulation test of blood as a specimen. The blood coagulation test unit 260 includes a device housing 280 having a substantially rectangular parallelepiped outer shape.

Inside the device housing 280, the blood coagulation test unit 260 includes a specimen container carry-in unit 290 for carrying in the specimen containers E; a first table 291 for arranging and holding in an annular shape a plurality of cuvettes F capable of accommodating specimens; a second table 292 for holding a plurality of reagent containers G in which reagents to be mixed with the specimens are accommodated; a heating unit 293 for holding and heating the cuvettes F; an analysis unit 294 for holding the cuvettes F to analyze the analysis sample (obtained by mixing the specimen and the reagent) of the cuvettes F; and a discharge unit 295 for discharging a cuvette F whose analysis is finished.

The blood coagulation test unit 260 includes, as a device to inject liquid into cuvettes F, a specimen injection arm 297 for injecting the specimen in the specimen container E carried into the specimen container carry-in unit 290 into the cuvette F of the first table 291, and two reagent injection devices 298 and 299 for injecting the reagent in the reagent container G of the second table 292 into the cuvette F.

Furthermore, the blood coagulation test unit 260 includes, as a device for conveying the cuvette F, a cuvette supply device 300 for supplying the cuvette F to the device main body, a first conveyance arm 301 for conveying the cuvette F supplied by the cuvette supply device 300 to the first table 291, a second conveyance arm 302 for conveying the cuvette F of the first table 291 to the first reagent injection device 298 and the heating unit 293, and a third conveyance arm 303 for conveying the cuvette F of the heating unit 293 to the second reagent injection device 299, the analysis unit 294, and the discharge unit 295.

In a plan view, the specimen container carry-in unit 290 is arranged on the front side in the device housing 280. The first table 291 and the second table 292 are arranged near the center in the device housing 280. The heating unit 293 is arranged on the right side in the device housing 280. The analysis unit 294 is arranged on the back (rear) side. The discharge unit 295 is arranged between the heating unit 293 and the analysis unit 294. The cuvette supply device 300 is arranged on the left side in the device housing 280 between the analysis unit 294 and the first table 291.

The specimen container carry-in unit 290 includes a rack carry-in unit 320 for carrying in a rack R for accommodating a plurality of specimen containers E; a specimen suction position 321 where the specimen injection arm 297 is accessible and the specimen is sucked from the specimen container E of the rack R by the specimen injection arm 297; a rack carry-out unit 322 for carrying out the rack R of the specimen container E from which the specimen is sucked; and a conveyance device 323 for conveying the rack R to the rack carry-in unit 320, the specimen suction position 321, and the rack carry-out unit 322 in this order. The conveyance device 323 transfers the rack R by using, for example, a conveyor.

The first table 291 has an annular shape. The first table 291 is configured to be rotatable by a drive unit (not shown). The first table 291 includes a plurality of cuvette holding portions 330 that hold the cuvettes F. The cuvette holding portions 330 are arranged at equal intervals over the whole circumference in the circumferential direction.

The second table 292 is arranged inside the first table 291. The second table 292 has a disc shape. The second table 292 is configured to be rotatable by a drive unit (not shown). The second table 292 includes a plurality of reagent container holding portions 340 that hold the reagent containers G. The reagent container holding portions 340 are arranged in a plurality of concentric circles, for example. The reagent container holding portions 340 are arranged at equal intervals along the circumferential direction, for example.

The heating unit 293 includes a circular heating plate 350. The heating plate 350 includes a plurality of cuvette holding portions 351 that hold the cuvettes F. The cuvette holding portions 351 are arranged at equal intervals over the whole circumference near the outermost circumference of the heating plate 350, for example. The heating plate 350 includes a heat source (not shown). The heating plate 350 can heat the liquid in the cuvette F held by the cuvette holding portion 351 to a predetermined temperature.

The analysis unit 294 includes a rectangular analysis plate 360. The analysis plate 360 includes a plurality of cuvette holding portions 361 that hold the cuvettes F. The cuvette holding portions 361 are arranged in a plurality of rows along the longitudinal direction of the analysis plate 360, for example. The analysis unit 294 includes an irradiation unit and a light receiving unit (not shown). The cuvette holding portion 361 is irradiated with light from the irradiation unit. The light transmitted through the analysis liquid in the cuvette F is received by the light receiving unit. The analysis unit 294 can analyze the specimen from the light reception result.

The discharge unit 295 includes a discharge hole 362 for discharging the cuvette F. The discharge hole 362 communicates with a cuvette collection unit (not shown) provided at the lower portion of the device housing 280.

The specimen injection arm 297 is arranged between the specimen suction position 321 of the specimen container carry-in unit 290 in the device housing 280 and the first table 291 in a plan view. The specimen injection arm 297 includes a drive unit 370 that drives the specimen injection arm 297 and a nozzle 371 that injects and sucks the specimen.

The drive unit 370 includes a rotation drive unit that rotates the specimen injection arm 297 in the plane direction between the specimen suction position 321 and the first table 291 and a lift drive unit that moves the specimen injection arm 297 up and down, for example. The nozzle 371 is provided at the tip portion of the specimen injection arm 297. The nozzle 371 can suck or inject the specimen with a pump or the like (not shown). With this configuration, the specimen injection arm 297 can access the specimen container E at the specimen suction position 321, can suck the specimen, can move to above the first table 291, and can inject the specimen into the cuvette F of the first table 291.

The reagent injection devices 298 and 299 include long and narrow arms 380 in a plan view, and are provided with nozzles 381 in the lower part thereof. The arm 380 of the first reagent injection device 298 extends from above the second table 292 to the vicinity of the heating unit 293. The arm 380 of the second reagent injection device 299 extends from the second table 292 to the vicinity of the analysis unit 294. The arm 380 is fixed to the ceiling of the device housing 280, for example.

The nozzle 381 is configured to be movable in the longitudinal direction and the vertical direction with respect to the arm 380 by a drive unit (not shown). The nozzle 381 of the first reagent injection device 298 is movable along the arm 380 from above the second table 392 to the vicinity of above the heating plate 350 of the heating unit 393. The nozzle 381 of the second reagent injection device 299 is movable along the arm 380 from above the second table 292 to the vicinity of above the analysis plate 360 of the analysis unit 294. The nozzle 381 can suck or inject a reagent with a pump or the like (not shown). The nozzle 381 includes a heat source. The nozzle 381 can heat the sucked reagent to a predetermined temperature. With this configuration, the nozzle 381 of the first reagent injection device 298 can access the reagent container G of the second table 292, suck the reagent, move to the vicinity of above the heating plate 350, and inject the reagent into the cuvette F held by the second conveyance arm 302 near the heating plate 350. The nozzle 381 of the second reagent injection device 299 can access the reagent container G of the second table 292, suck the reagent, move to the vicinity of above the analysis plate 360, and inject the reagent into the cuvette F held by the third conveyance arm 303 near the analysis plate 360.

The cuvette supply device 300 stores an empty cuvette F input from the outside. The cuvette supply device 300 sequentially supplies the cuvette F to a cuvette carry-out unit 400.

The first conveyance arm 301 is arranged between the cuvette conveyance path 401 of the cuvette supply device 300 and the first table 291 in a plan view, for example. The first conveyance arm 301 includes a drive unit 410 that drives the first conveyance arm 301 and a cuvette holding portion 411 that holds the cuvette F. The drive unit 410 includes a rotation drive unit that rotates the first conveyance arm 301 in the plane direction between the cuvette carry-out unit 400 of the cuvette supply device 300 and the first table 291, and a lift drive unit that moves the first conveyance arm 301 up and down, for example. The cuvette holding portion 411 is provided at the tip portion of the first conveyance arm 301. The cuvette holding portion 411 has a U shape, for example. The cuvette holding portion 411 can hold the cuvette F by hooking the head portion of the cuvette F from below. With this configuration, the first conveyance arm 301 can hold the cuvette F of the cuvette carry-out unit 400 of the cuvette supply device 300, move the cuvette F to above the first table 291, and place the cuvette F on the cuvette holding portion 330 of the first table 291.

The second conveyance arm 302 is arranged on the heating plate 350 of the heating unit 293, for example. The second conveyance arm 302 includes a drive unit 420 that drives the second conveyance arm 302 and a cuvette holding portion 421 that holds the cuvette F. The drive unit 420 includes a rotation drive unit that rotates the second conveyance arm 302 in the plane direction between the first table 291 and the heating plate 350, an lift drive unit that moves the second conveyance arm 302 up and down, and a telescopic drive unit that expands and contracts the second conveyance arm 302 in the horizontal direction, for example. The cuvette holding portion 421 is provided at the tip portion of the second conveyance arm 302. The cuvette holding portion 421 has a U shape, for example. The cuvette holding portion 421 can hold the cuvette F by hooking the head portion of the cuvette F from below. With this configuration, the second conveyance arm 302 can hold the cuvette F of the cuvette holding portion 330 of the first table 291, move the cuvette F to below the nozzle 381 of the first reagent injection device 298, or move the cuvette F to the cuvette holding portion 351 of the heating plate 350. The second conveyance arm 302 can convey the cuvette F to the immunological test unit 261 through an access unit 422 being an opening of the device housing 280.

The third conveyance arm 303 is arranged on the back surface side of the analysis unit 294 in the device housing 280 in a plan view. The third conveyance arm 303 includes a drive unit 430 that drives the third conveyance arm 303 and a cuvette holding portion 431 that holds the cuvette F. The drive unit 430 includes a drive mechanism that moves the third conveyance arm 303 in the left-right direction, the front-back direction, and the up-down direction. The cuvette holding portion 431 is provided at the tip portion of the third conveyance arm 303. The cuvette holding portion 431 has a U shape, for example. The cuvette holding portion 431 can hold the cuvette F by hooking the head portion of the cuvette F from below. With this configuration, the third conveyance arm 303 can hold the cuvette F of the cuvette holding portion 351 of the heating plate 350, move the cuvette F to below the nozzle 281 of the second reagent injection device 299, or move the cuvette F to the cuvette holding portion 361 of the analysis unit 294. The third conveyance arm 303 can convey the cuvette F whose analysis is finished to the discharge unit 295.

<Immunological Test Unit>

Figure 15:
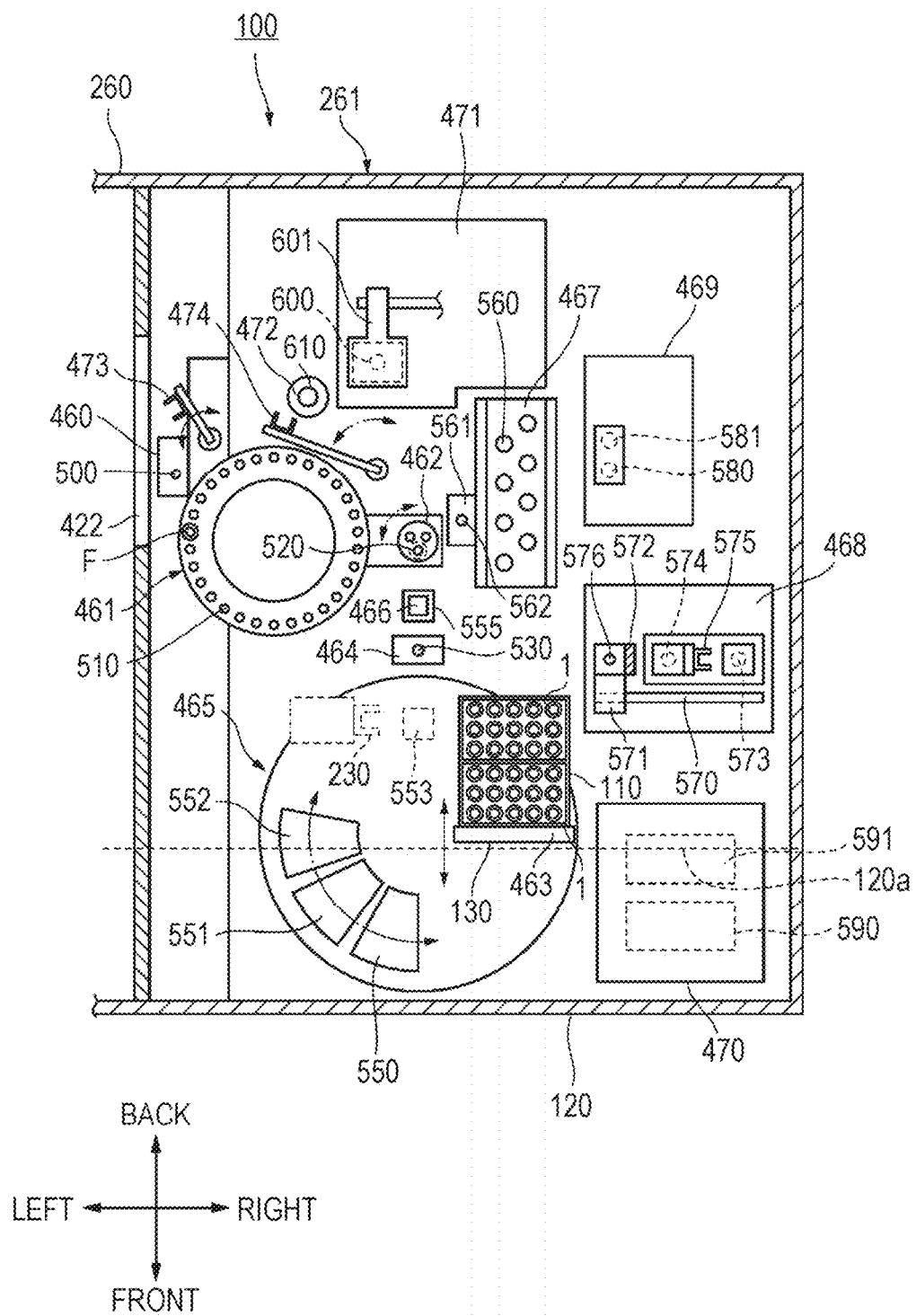
FIG. 15 is an explanatory diagram of a cross section showing an example of the internal configuration of the immunological test unit of the specimen analysis device.
Figure 16:
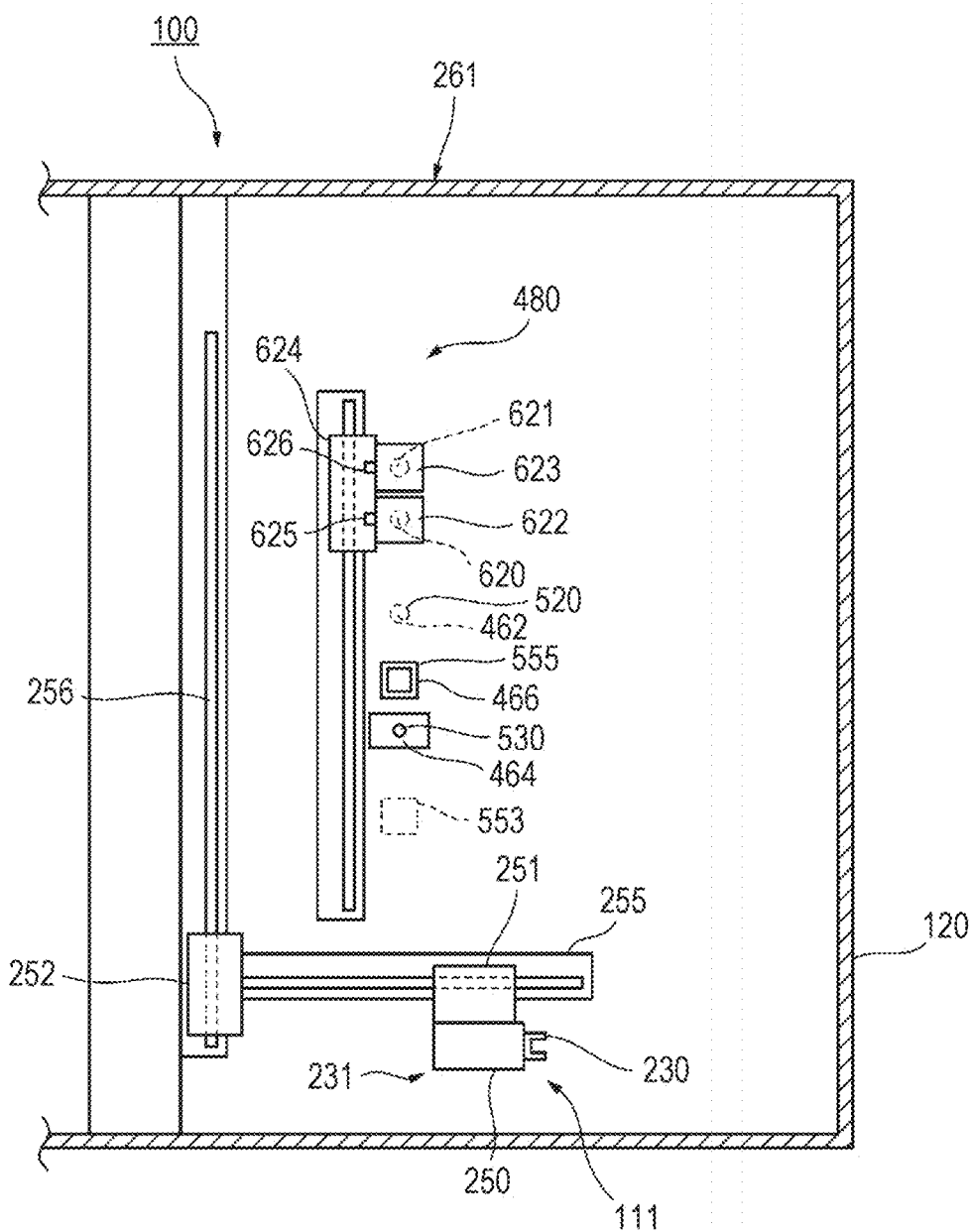
FIG. 16 is an explanatory diagram of a cross section showing an example of the configuration of a dispensing device of the immunological test unit of the specimen analysis device.

FIG. 15 is a schematic diagram showing an internal configuration of the immunological test unit 261. FIG. 16 is a schematic diagram showing the configuration of the conveyance unit 111 and the dispensing device inside the immunological test unit 261.

The immunological test unit 261 automatically performs analysis related to an immunological test of blood being a specimen, for example. The immunological test unit 261 includes a device housing 120 having a substantially rectangular parallelepiped outer shape.

As shown in FIG. 15, in the device housing 120, the immunological test unit 261 includes a specimen carry-in unit 460, a cuvette table 461, a specimen extraction unit 462, a container carry-in unit 463, a specimen injection unit 464, a reagent table 465, a cleaning unit 466, a heating unit 467, a BF separation unit 468, a reagent dispensing unit 469, a reagent accommodation unit 470, a measurement unit (analysis unit) 471, a discard unit 472, a first conveyance arm 473, and a second conveyance arm 474.

As shown in FIG. 16, the immunological test unit 261 further includes a conveyance unit 111 and a dispensing device 480 in the device housing 120.

As shown in FIG. 15, the specimen carry-in unit 460 is provided in the vicinity of the access unit 422 of the blood coagulation test unit 260 and on the left side of the device housing 120. The specimen carry-in unit 460 includes a cuvette holding portion 500. The second conveyance arm 302 of the blood coagulation test unit 260 can convey the cuvette F of the heating unit 293 to the cuvette holding portion 500 of the specimen carry-in unit 460 through the access unit 422.

The cuvette table 461 is provided in the vicinity of the specimen carry-in unit 460. The cuvette table 461 includes a plurality of cuvette holding portions 510 formed in a disc shape and arranged in an annular shape.

The specimen extraction unit 462 is provided near the cuvette table 461 and closer to the center of the device housing 120 than the cuvette table 461. The specimen extraction unit 462 includes a cuvette holding portion 520 that holds the cuvette F.

The container carry-in unit 463 is provided in the vicinity of the front surface portion 120a of the device housing 120. The container carry-in unit 463 includes the above-described drawer portion 130. The drawer portion 130 includes a rack installation portion 110 in which the container rack 1 is installed.

The specimen injection unit 464 is provided on the left side of the container carry-in unit 463. The specimen injection unit 464 includes a container holding portion 530 that holds the container A.

The reagent table 465 is provided on the front side of the device housing 120. The reagent table 465 is configured to be able to install a plurality of reagent containers 550, 551, and 552 that accommodate reagents used for measurements related to immunological tests. The reagent table 465 is configured to be rotatable in the circumferential direction. For example, the reagent container 550 accommodates the R1 reagent, the reagent container 551 accommodates the R2 reagent, and the reagent container 552 accommodates the R3 reagent. The reagent table 465 is provided with a reagent extraction unit 553. When each of the reagent containers 550 to 552 moves to the reagent extraction unit 553, a reagent is extracted from the corresponding one of the reagent containers 550 to 552.

The cleaning unit 466 is provided between the specimen extraction unit 462 and the specimen injection unit 464. The cleaning unit 466 includes a cleaning tank 555 that stores the cleaning liquid.

The specimen extraction unit 462, the cleaning unit 466, the specimen injection unit 464, and the reagent extraction unit 553 are arranged on a straight line in the front-back direction in a plan view.

The heating unit 467 is arranged on the right side of the specimen extraction unit 462 and behind the container carry-in unit 463. The heating unit 467 includes a plurality of container holding portions 560 that hold and heat the containers A. On the left side of the heating unit 476 adjacent to the heating unit 476, a container holding portion 561 is provided. The container holding portion 561 includes a container holding hole 562 that holds the container A.

The BF separation unit 468 is arranged on the right side of the device housing 120. The BF separation unit 468 includes a rail 570 extending in the left-right direction; a support member 571 for moving along the rail 570; a magnet 572 installed on the support member 571; a nozzle 573 for sucking liquid components in the container A; a nozzle 574 for discharging the cleaning liquid into the container A; and a stirring unit 575 for gripping the container A and applying vibrations. The support member 571 includes a container holding hole 576 that holds the container A. In addition, the BF separation unit 468 includes a mechanism for transferring the support member 571 in the left-right direction along the rail 570 and a mechanism for transferring the nozzles 573 and 574 and the stirring unit 575 in the up-down direction.

The reagent dispensing unit 469 is provided on the back side of the BF separation unit 468. The reagent dispensing unit 469 includes a nozzle 580 for discharging the R4 reagent and a nozzle 581 for discharging the R5 reagent, for example.

The reagent accommodation unit 470 is provided on the front side of the device housing 120. The reagent accommodation unit 470 includes a reagent container 590 that accommodates the R4 reagent and a reagent container 591 that accommodates the R5 reagent.

The measurement unit 471 is provided on the back side of the device housing 120. The measurement unit 471 includes a container holding portion 600 that holds the container A, and a lid 601 that covers the upper part of the container holding portion 600 and can be opened and closed, for example. The measurement unit 471 includes an irradiation unit and a light receiving unit (not shown). The container A of the container holding portion 600 is irradiated with light from the irradiation unit. The light transmitted through the analysis liquid in the container A is received by the light receiving unit. The measurement unit 471 can analyze the specimen from the light reception result.

The discard unit 472 is provided in the vicinity of the specimen extraction unit 462 and the measurement unit 471. The discard unit 472 includes a discard port 610 for discarding the cuvette F and the container A.

The first conveyance arm 473 is provided in the vicinity of the specimen carry-in unit 460 and the cuvette table 461. The first conveyance arm 473 can convey the cuvette F of the cuvette holding portion 500 of the specimen carry-in unit 460 to the cuvette holding portion 510 of the cuvette table 461.

The second conveyance arm 474 is provided in the vicinity of the measurement unit 471, the discard unit 472, and the specimen extraction unit 462. The second conveyance arm 474 can convey the cuvette F of the specimen extraction unit 462 and the container A of the measurement unit 471 to the discard unit 472.

As shown in FIG. 16, the conveyance unit 111 is installed on the side surface of the immunological test unit 261. As described above, the conveyance unit 111 includes a moving mechanism 231 that moves the holding portion 230 for holding the container A in the left-right direction, the front-back direction, and the up-down direction. As shown in FIG. 6, the moving mechanism 231 includes an up-down moving unit 250, a left-right moving unit 251, and a front-back moving unit 252. The moving mechanism 231 can move the container A held by the holding portion 230 to any position in the device housing 120.

The dispensing device 480 is installed on the ceiling surface of the immunological test unit 261. The dispensing device 480 includes two nozzles 620 and 621; nozzle holding portions 622 and 623 for respectively holding the nozzles 620 and 621; a front-back moving unit 624 for moving the two nozzle holding portions 622 and 623 in the front-back direction; and up-down moving units 625 and 626 for respectively moving the nozzle holding portions 622 and 623 in the up-down direction.

The nozzles 620 and 621 are arranged in the front-back direction. The nozzles 620 and 621 are positioned on the same straight line in the front-back direction as the specimen extraction unit 462, the cleaning unit 466, the specimen injection unit 464, and the reagent extraction unit 553. The nozzles 620 and 621 can access the specimen extraction unit 462, the cleaning unit 466, the specimen injection unit 464, and the reagent extraction unit 553 with the front-back moving unit 624 and the up-down moving units 625 and 626. The nozzle 620 is used for specimen dispensing. The nozzle 621 is used for reagent dispensing.

<Control Unit>

The control unit 262 shown in FIG. 13 is a computer, for example. The control unit 262 executes the program stored in the memory with the CPU, whereby the control unit 262 can control drive of various drive units such as the conveyance unit 111 in the specimen analysis device 100 and perform the specimen analysis processing. For example, in the immunological test unit 261, based on the detection result of the sensor 142, the control unit 262 can detect that the rack installation portion 110 of the drawer portion 130 is pulled out and the rack installation portion 110 is stored. Based on the detection result of the container detection sensor 180, the control unit 262 can detect whether the container A is in the insertion holes 170a of the bases 160 and 161.

Figure 17:
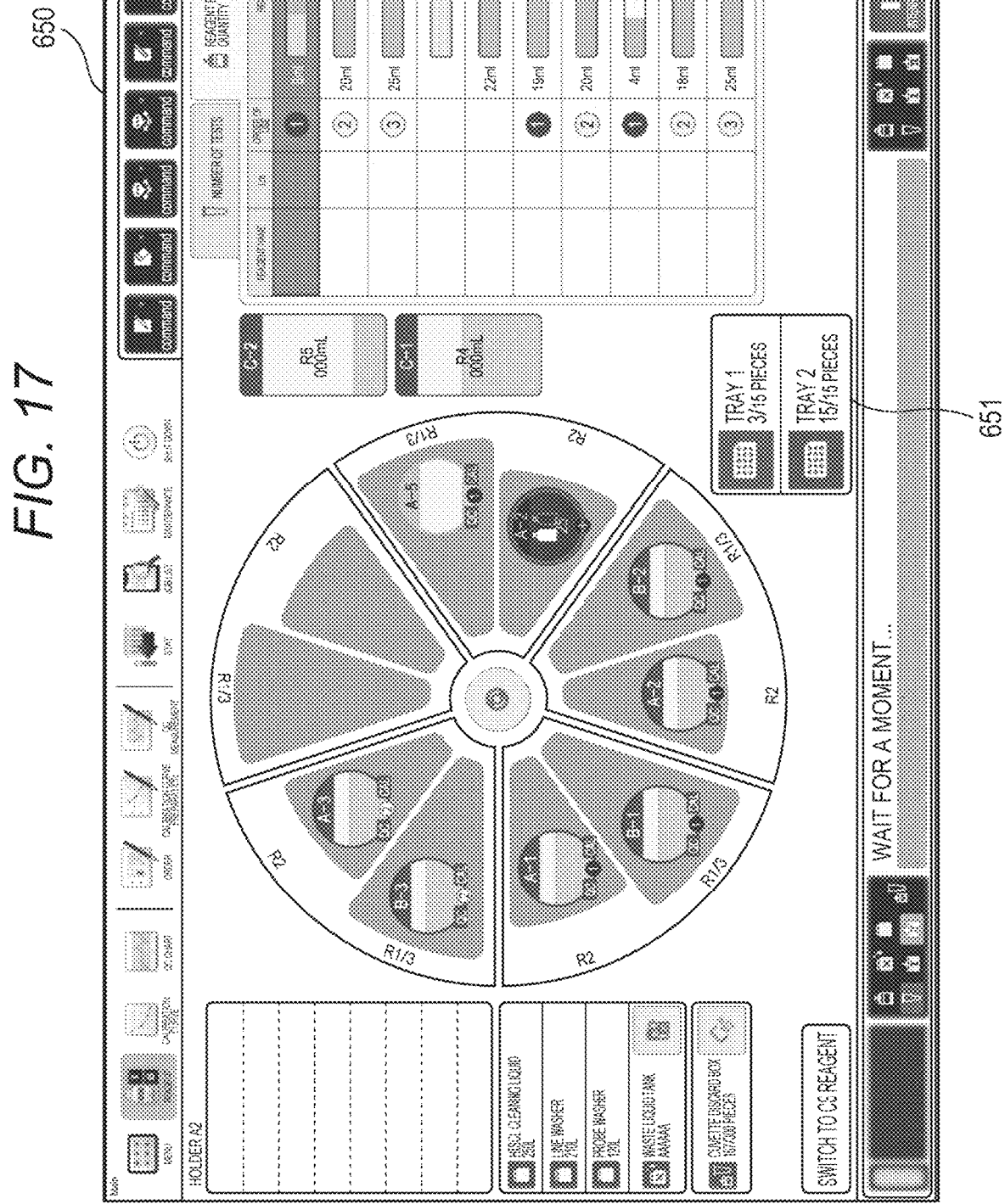
FIG. 17 is an explanatory diagram showing an example of a display screen of the display unit of the specimen analysis device.

As shown in FIG. 17, on the display unit 263 such as a display, the control unit 262 can display a display screen 650 indicating the remaining quantity of the containers A in the container rack 1 installed in the rack installation portion 110. The control unit 262 counts signals issued for conveyance instruction of the containers A, for example, whereby the remaining quantity of the containers A can be grasped. In a container remaining quantity display region 651 of the display screen 650, the remaining quantity of the containers A in the container rack 1 can be displayed for each of the two bases 160 (tray 1) and 161 (tray 2). The display screen 650 may also display other information such as the remaining quantity of reagents.

Next, an example of a specimen analysis method using the specimen analysis device 100 configured as described above will be described.

<Supply and Replacement of Container Rack>

Figure 18:
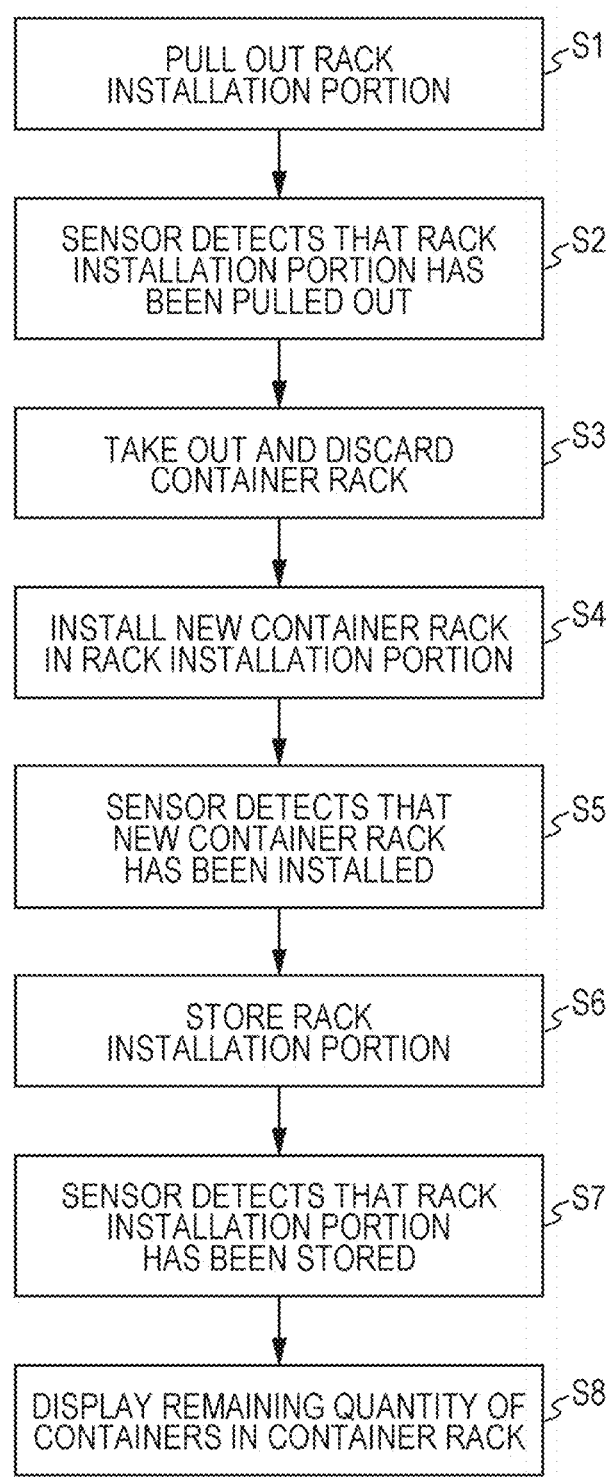
FIG. 18 is a flowchart showing an example of main steps at the time of replacing a container rack.

FIG. 18 shows an example of a flow at the time of supplying and replacing the container rack. When the container rack 1 is supplied or replaced, first, a container rack 1 in which empty containers A are held in all the holding holes 20 is prepared as shown in FIGS. 1, 2, and 3. At this time, the container rack 1 is hermetically sealed in a bag in a sterilized state, for example.

Next, when the operation of the specimen analysis device 100 is stopped, in the drawer portion 130 shown in FIG. 8, the lock mechanism 143 unlocks the rack installation portion 110 of the drawer portion 130. Next, as shown in FIG. 7, the rack installation portion 110 of the drawer portion 130 is pulled out from the front surface portion 120a of the device housing 120 (step S1). Then, the sensor 142 detects that the rack installation portion 110 is pulled out (step S2).

Figure 19:
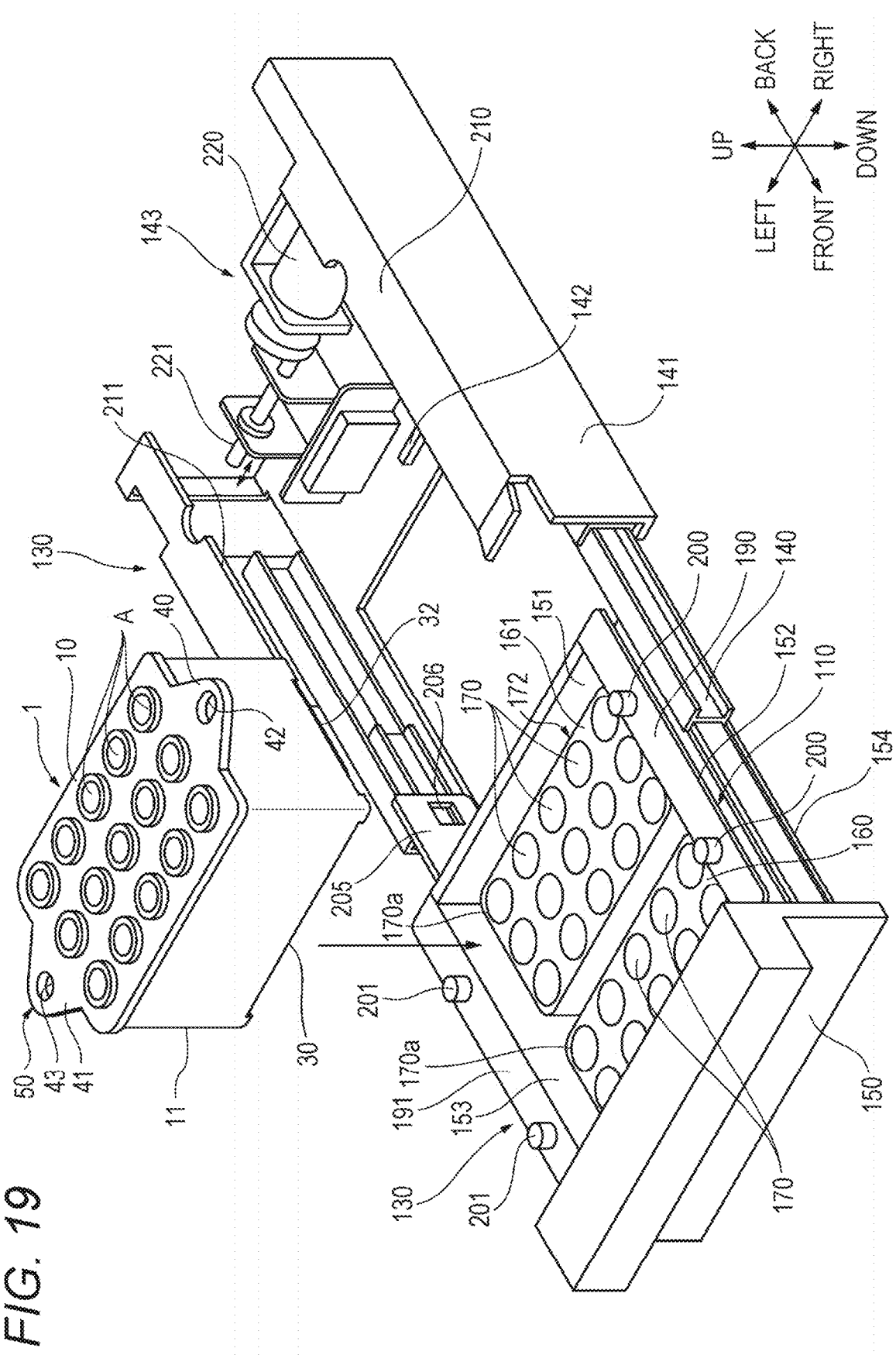
FIG. 19 is a perspective view of the drawer portion showing a state in which the drawer portion is pulled out.

Next, the used container rack 1 is taken out from the rack installation portion 110. At this time, the taken-out container rack 1 is discarded (step S3). Then, as shown in FIG. 19, a new container rack 1 that holds the container A is installed in the rack installation portion 110 (step S4). At this time, the container rack 1 is fitted into the base 160 (161) of the rack installation portion 110 as shown in FIGS. 9 and 10. The container rack 1 is supported due to the protruding portion 35 of the leg portion 11 being in contact with the bottom wall 154 around the base 160 (161). As shown in FIG. 10, the container rack 1 is installed in the rack installation portion 110 in such a direction that the recessed portion 37 of the leg portion 11 is positioned at the position of the container detection sensor 180. The container A of the container rack 1 is inserted into the insertion hole 170 of the base 160 (161) and supported by the bottom of the insertion hole 170. The container A is pushed up to the bottom of the insertion hole 170. The head portion a2 of the container A protrudes above from the holding portion 10.

When the container rack 1 is installed in the rack installation portion 110, as shown in FIG. 11, the protrusion 200 on the frame plate 190 of the rack installation portion 110 is fitted into the first fastening portion 42 of the elongated hole of the projecting portion 40 of the container rack 1, and the protrusion 201 on the frame plate 191 of the rack installation portion 110 is fitted into the second fastening part 43 of the round hole of the projecting portion 41 of the container rack 1. Thus, the container rack 1 is positioned with respect to the rack installation portion 110.

Next, the container detection sensor 180 checks that the container A is in the insertion hole 170a at a predetermined position, that is, the insertion hole 170a that the conveyance unit 111 first accesses among the insertion holes. Thus, it is checked that containers A are inserted into all the insertion holes 170 of the base 160 of the rack installation portion 110, that is, that the container rack 1 on the base 160 has been replaced with a new one (step S5).

Figure 20:
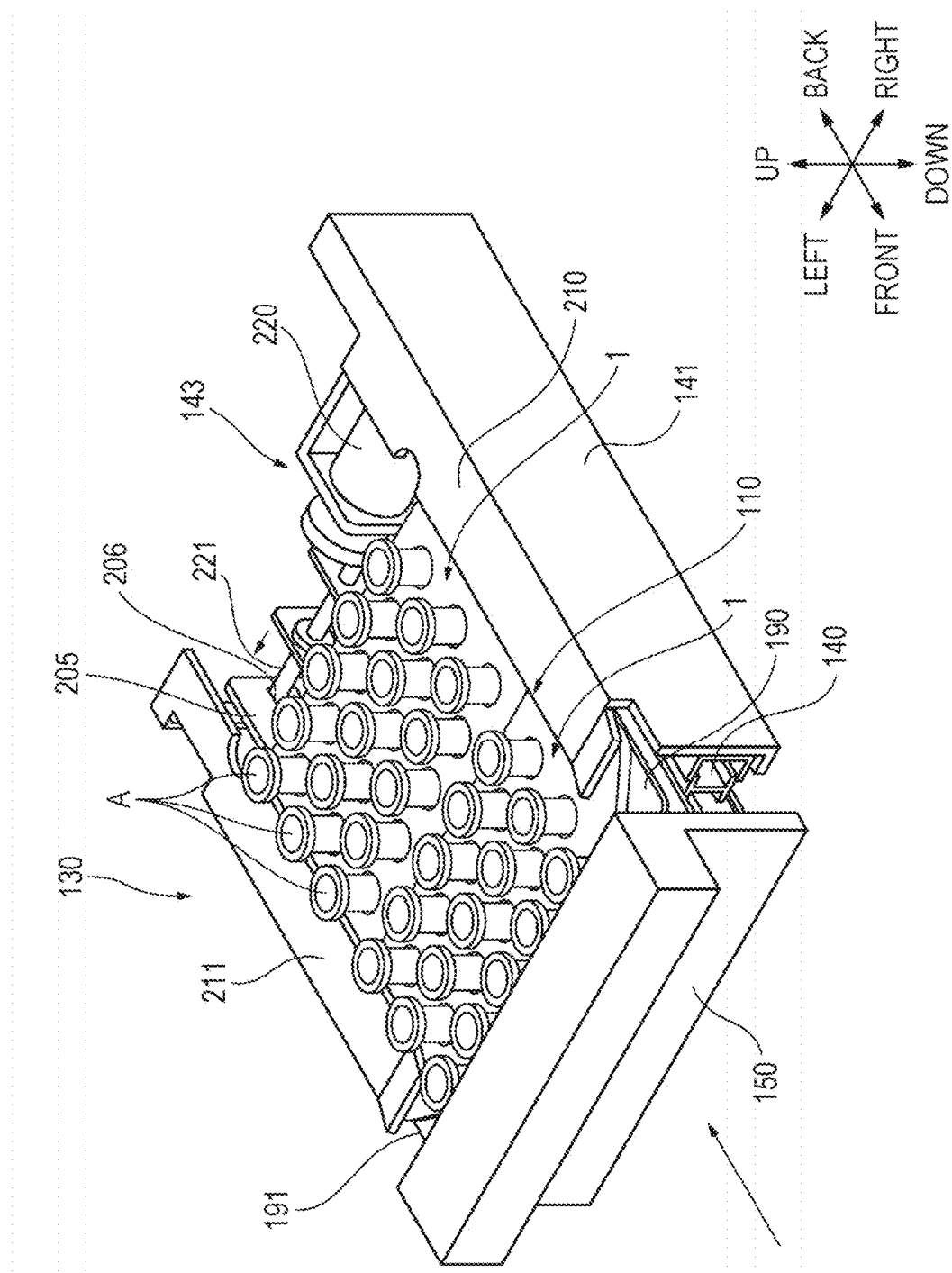
FIG. 20 is a perspective view of the drawer portion showing a state in which the drawer portion is stored.

Next, as shown in FIG. 20, the rack installation portion 110 of the drawer portion 130 is stored in the device housing 120 (step S6). The sensor 142 detects that the rack installation portion 110 is stored (step S7). The display screen 650 shown in FIG. 17 displays the remaining quantity of the containers A in the two base 160 (tray 1) and base 161 (tray 2) (step S8). In this case, the number of containers in the container rack 1 of the base 160 is maximum (for example, 15).

When the rack installation portion 110 is stored, the stopper 221 enters the opening 206 of the protruding plate 205 by the lock mechanism 143, and the rack installation portion 110 is fixed to the frame unit 141.

Thereafter, when specimen analysis is performed in the specimen analysis device 100, the holding portion 230 of the conveyance unit 111 shown in FIG. 6 is moved to the container rack 1 of the rack installation portion 110 by the moving mechanism 231, and two arms 240 access the body portion a1 of the container A from the side and hold the container A. The holding portion 230 is moved to a predetermined position by the moving mechanism 231 and the container A is conveyed. The containers A in the insertion holes 170a of the container rack 1 are first conveyed, and then the containers A are carried out in a predetermined order. The remaining quantity of the containers A in the container rack 1 of the rack installation portion 110 is displayed on the display screen 650 shown in FIG. 17. When the container rack 1 becomes empty or the remaining quantity of the containers A becomes less than the predetermined number, the container rack 1 is replaced again as described above.

<Operation of Blood Coagulation Test Unit>

In the blood coagulation analysis unit 260 shown in FIG. 14, before analysis processing of a specimen such as blood is started, a plurality of empty cuvettes F are input into the cuvette supply device 300 by the user and sent to the cuvette carry-out unit 400 through the conveyance path 401. The cuvette F of the cuvette carry-out unit 400 is conveyed to the first table 291 by the first conveyance arm 301 and accommodated in the cuvette holding portion 330. This is repeated, and empty cuvettes F are arranged on the first table 291 in the circumferential direction.

When the specimen analysis processing is started, first, a rack R in which a plurality of specimen containers E are accommodated is carried into the rack carry-in unit 320 of the specimen container carry-in unit 290. The rack R is conveyed to the specimen suction position 321 by the conveyance device 323. Next, the specimen in the specimen container E of the rack R is sucked by the specimen injection arm 297 and injected into the empty cuvette F of the first table 291. Next, the cuvette F is held by the second conveyance arm 302 and moved to below the first reagent injection device 298.

Next, the reagent in the reagent container G of the second table 292 is sucked by the nozzle 381 of the first reagent injection device 298, heated to a predetermined temperature, and injected into the cuvette F held by the second conveyance arm 302. Thus, the specimen and the reagent in the cuvette F are mixed.

Next, the cuvette F is conveyed to the heating plate 350 of the heating unit 293 by the second conveyance arm 302. The mixed liquid of the specimen and the reagent in the cuvette F is heated to a predetermined temperature.

Subsequently, the cuvette F is held by the third conveyance arm 303 and is moved to below the second reagent injection device 299, for example. Next, the reagent in the reagent container G of the second table 292 is sucked by the nozzle 381 of the second reagent injection device 299 and injected into the cuvette F held by the third conveyance arm 303. Thus, the specimen and the reagent in the cuvette F are mixed to become an analysis sample.

Next, the cuvette F is conveyed to the analysis plate 360 of the analysis unit 294 by the third conveyance arm 303. In some cases, the reagent is not injected by the second reagent injection device 299. In this case, the cuvette F of the heating unit 293 is directly conveyed to the analysis unit 294 by the third conveyance arm 303.

In the analysis unit 294, measurement related to the blood coagulation test of the specimen is performed. When the measurement is finished, the cuvette F is conveyed to the discharge unit 295 by the third conveyance arm 303 to be discharged.

<Operation of Immunological Test Unit>

First, the cuvette F accommodating the specimen of the blood coagulation test unit 260 is carried into the immunological test unit 261 shown in FIG. 15 through the access unit 422 by the second conveyance arm 302, and is held by the cuvette holding portion 500 of the specimen carry-in unit 460. The cuvette F is conveyed to the cuvette table 461 by the first conveyance arm 473. Next, the cuvette F of the cuvette table 461 is conveyed to the specimen extraction unit 462 by the conveyance unit 111.

On the other hand, the empty container A in the container rack 1 installed in the rack installation portion 110 of the container carry-in unit 463 is held by the holding portion 230 of the conveyance unit 111 and conveyed to the specimen injection unit 464.

Next, the nozzle 620 of the dispensing device 480 shown in FIG. 16 moves to the specimen extraction unit 462 and extracts the specimen from the cuvette F. The nozzle 620 moves to the specimen injection unit 464 and injects the specimen into the container A of the specimen injection unit 464. Thus, the specimen is transferred from the cuvette F to the container A. The nozzle 620 moves to the cleaning unit 466 and is cleaned. The empty cuvette F is conveyed to the discard unit 472 by the second conveyance arm 474 to be discarded.

Next, the container A is conveyed to the cleaning unit 466 by the conveyance unit 111. The nozzle 620 of the dispensing device 480 moves to the reagent extraction unit 553 of the reagent table 465, extracts the R1 reagent from the reagent container 550, subsequently moves to the cleaning unit 466, and injects the R1 reagent into the container A of the cleaning unit 466. The nozzle 620 finishing the injection is cleaned by the cleaning unit 466.

Next, the container A is conveyed to the heating unit 467 shown in FIG. 15 by the conveyance unit 111 and heated. Next, the container A is returned to the cleaning unit 466 by the conveyance unit 111. The nozzle 620 of the dispensing device 480 shown in FIG. 16 extracts the R2 reagent from the reagent container 551 of the reagent extraction unit 553 of the reagent table 465, moves to the cleaning unit 466, and injects the R2 reagent into the container A. The nozzle 620 finishing the injection is cleaned by the cleaning unit 466.

Next, the container A is conveyed to the heating unit 467 shown in FIG. 15 by the conveyance unit 111 and heated. The R1 reagent contains a supplementary substance that binds to the test substance of the specimen, and the R2 reagent contains magnetic particles. When the R1 reagent and the R2 reagent are mixed with the specimen and heated by the heating unit 467, the test substance contained in the specimen binds to the magnetic particles via the supplementary substance by the antigen-antibody reaction. Thus, the complex obtained by binding the test substance and the magnetic particles is generated.

Next, the container A is conveyed to the BF separation unit 468. In the BF separation unit 468, the container A is held in the container holding hole 576 of the support member 571, and the complex in the specimen is separated by the magnet 572. Next, the container A is conveyed to directly below the nozzle 573, and the liquid component in the container A is removed by the nozzle 573. Next, the container A is conveyed to directly below the nozzle 574, and the cleaning liquid is supplied to the container A. Next, the container A is held in the stirring unit 575 and stirred. Subsequently, the container A is conveyed again to directly below the nozzle 573, and the liquid component in the container A is removed by the nozzle 573. In the BF separation unit 468, this operation is repeated.

In the BF separation unit 468, impurities and buffy coat components that hinder measurement by the measurement unit 471 are removed from the complex obtained by binding the test substance of the specimen and the magnetic particles. Examples of the test substance of the specimen in the measurement unit 471 include an antigen, an antibody, and a protein.

Next, the container A is returned to the cleaning unit 466 by the conveyance unit 111. The nozzle 620 of the dispensing device 480 extracts the R3 reagent from the reagent container 552 of the reagent extraction unit 553 of the reagent table 465, moves to the cleaning unit 466, and injects the R3 reagent into the container A. The nozzle 620 finishing the injection is cleaned by the cleaning unit 466. The container A is conveyed to the heating unit 467 by the conveyance unit 111 and heated.

The R3 reagent includes a labeled antibody in which an antibody is used as a capture substance. When the R3 reagent is mixed with the specimen in the container A and heated by the heating unit 467, a complex obtained by binding the test substance of the specimen, the capture antibody, the magnetic particle, and the labeled antibody is generated.

The container A in which the R3 reagent is mixed is conveyed to the BF separation unit 468 and processed again.

Next, the container A is conveyed to the reagent dispensing unit 469 by the conveyance unit 111, the R4 reagent is injected into the container A by the nozzle 580, and the R5 reagent is injected into the container A by the nozzle 581.

The R4 reagent is a reagent for dispersing the complex in the container A. The R5 reagent is a reagent containing a luminescent substrate that generates light by reaction with a labeled antibody bound to the complex. When the complex and the R5 reagent are mixed, chemiluminescence is generated by the reaction between the labeled antibody bound to the complex and the luminescent substrate.

The container A in which the R4 reagent and the R5 reagent are mixed is conveyed to the heating unit 467 by the conveyance unit 111 and heated. The heated container A is held in the container holding portion 561 by the conveyance unit 111.

Next, the container A is conveyed to the measurement unit 471 by the conveyance unit 111, and measurement related to the immunological test of the specimen is performed. The container A finishing the measurement is conveyed to the discard unit 472 by the second conveyance arm 474 and discarded.

According to the present embodiment, the container rack 1 includes a holding portion 10 and a leg portion 11, the leg portion 11 is configured such that the container A in the holding hole 20 is exposed in a bottom view, and when the container rack 1 is installed in the rack installation portion 110 of the specimen analysis device 100, the container A held in the holding hole 20 is restricted in movement by the rack installation portion 110. As a result, the container rack 1 has a simple structure with a small number of parts and does not require highly accurate dimensions, so that the cost of the container rack 1 can be reduced. The shaking and displacement of the container A of the container rack 1 in the specimen analysis device 100 can be reduced.

The container rack 1 is configured such that when the container rack 1 is installed in the rack installation portion 110 of the specimen analysis device 100, the container A held in the holding hole 20 is inserted into the insertion hole 170 provided for each container A of the rack installation portion 110, and the movement of the container A is restricted. Thus, it is possible to effectively reduce the shaking and displacement of the container A of the container rack 1 in the specimen analysis device 100.

The container rack 1 is configured such that when the container rack 1 is installed in the rack installation portion 110 of the specimen analysis device 100, the bottom of the container A held in the holding hole 20 is supported by the bases 160 and 161 of the rack installation portion 110, and the movement of the container A is restricted. Thus, it is possible to appropriately reduce the shaking and displacement of the container A of the container rack 1 in the specimen analysis device 100.

The container rack 1 is configured such that the container A is pushed upward relatively to the holding hole 20 when the bottom of the container A is supported by the bases 160 and 161 of the rack installation portion 110. Thus, the conveyance unit 111 of the specimen analysis device 100 can easily hold the container A from the side, and the container A can be held and conveyed stably.

The leg portion 11 is configured to be supported by the rack installation portion 110 when the container rack 1 is installed in the rack installation portion 110 of the specimen analysis device 100. Thus, the container rack 1 can be stably installed in the rack installation portion 110.

The leg portion 11 is configured to be fitted and supported by the rack installation portion 110 when the leg portion 11 is in a specific direction with respect to the rack installation portion 110 of the specimen analysis device 100, and the leg portion 11 is configured not to be fitted and supported by the rack installation portion 110 when the leg portion 11 is in a direction other than the specific direction. Thus, the user can easily install the container rack 1 in the rack installation portion 110 without making a mistake in the direction of the container rack 1.

Since the leg portion 11 has side walls 30 to 33 surrounding the periphery of the lower space C of the holding portion 10, the leg portion 11 has high strength and can stably support the holding portion 10 of the container rack 1. As a result, the position of the container A in the specimen analysis device 100 is stabilized, and the conveyance of the container A by the conveyance unit 111 can be stabilized.

The side walls 30 to 33 have side wall lower portions 30a to 33a uneven in the up-down direction. The side wall lower portions 30a to 33a are configured such that, when the container rack 1 is installed in the rack installation portion 110 of the specimen analysis device 100, only the protruding portion 35 is in contact with and supported by the rack installation portion 110. Thus, the area where the leg portion 11 is in contact with the rack installation portion 110 is reduced, so that when the container rack 1 is installed in the rack installation portion 110, rattling of the container rack 1 can be reduced. As a result, the conveyance of the container A in the specimen analysis device 100 by the conveyance unit 111 can be stabilized. Since it is sufficient to consider only the dimensional accuracy of the protruding portion 35, the cost of the container rack 1 can be reduced.

Since the container rack 1 includes a rack positioning portion 50 that positions the container rack 1 with respect to the rack installation portion 110 of the specimen analysis device 100, the container rack 1 can be fixed to a desired position with respect to the rack installation portion 110. As a result, the conveyance of the container A by the conveyance unit 111 in the specimen analysis device 100 can be stabilized.

Since the rack positioning portion 50 includes projecting portions 40 and 41 respectively protruding from the holding portion 10 to the left and right (horizontally opposite directions), and fastening portions 42 and 43 provided in the projecting portions 40 and 41 and fastened to the protrusions 200 and 201 of the rack installation portion 101 of the specimen analysis device 100, the container rack 1 can be suitably positioned.

Since the fastening portion 42 of one projecting portion 40 has an elongated hole and the fastening portion 43 of the other projecting portion 41 has a round hole, the container rack 1 can be positioned with a simple structure. Changing the shape of the left and right holes allows the container rack 1 to be installed always in a fixed direction with respect to the rack installation portion 110.

Since the container rack 1 before use is hermetically sealed in a bag in a state of holding a plurality of containers A, the container rack 1 and the containers A can be transported while maintaining aseptic conditions.

Since the specimen analysis device 100 includes frame plates 190 and 191 on both the left and right sides across the rack installation portion 110, and the protrusions 200 and 201 (rack positioning portions) are provided on the frame plates 190 and 191, the container rack 1 can be suitably positioned.

Since the specimen analysis device 100 includes a drawer portion 130 that allows the rack installation portion 110 to be taken in and out of the device housing 120, the container rack 1 in the specimen analysis device 100 can be suitably replaced.

The specimen analysis device 100 includes a sensor 142 for detecting at least any one of the rack installation portion 110 of the drawer portion 130 being pulled out of the device housing 120 and the drawer portion 130 being accommodated in the device housing 120. Thus, by using the detection result of the sensor 142, it is possible to grasp that the specimen analysis device 100 is under replacing the container rack 1 or has finished replacing the container rack 1, for example.

The specimen analysis device 100 includes a lock mechanism 143 that fixes and releases the state in which the rack installation portion 110 of the drawer portion 130 is accommodated in the device housing 120. Thus, it is possible to prevent the drawer portion 130 from being pulled out during operation of the specimen analysis device 100, for example.

The specimen analysis device 100 includes a container detection sensor 180 that detects the presence of the container A in the specific holding hole 20 of the container rack 1 of the rack installation portion 110. Thus, since the holding state of the container A of the container rack 1 can be grasped, it can be detected that the container rack 1 has been replaced, for example.

Since the specimen analysis device 100 includes a display unit 263 that displays the number of containers A remaining in the container rack 1 of the rack installation portion 110, the user can be notified of the remaining quantity of containers A in the container rack 1.

The preferred embodiments of the present disclosure are described above with reference to the accompanying drawings, but the present disclosure is not limited to those examples. It is obvious for those skilled in the art that various changes or modifications can be conceived within the scope of the idea described in the claims, and it is understood that these naturally belong to the technical scope of the present disclosure.

Figure 21:
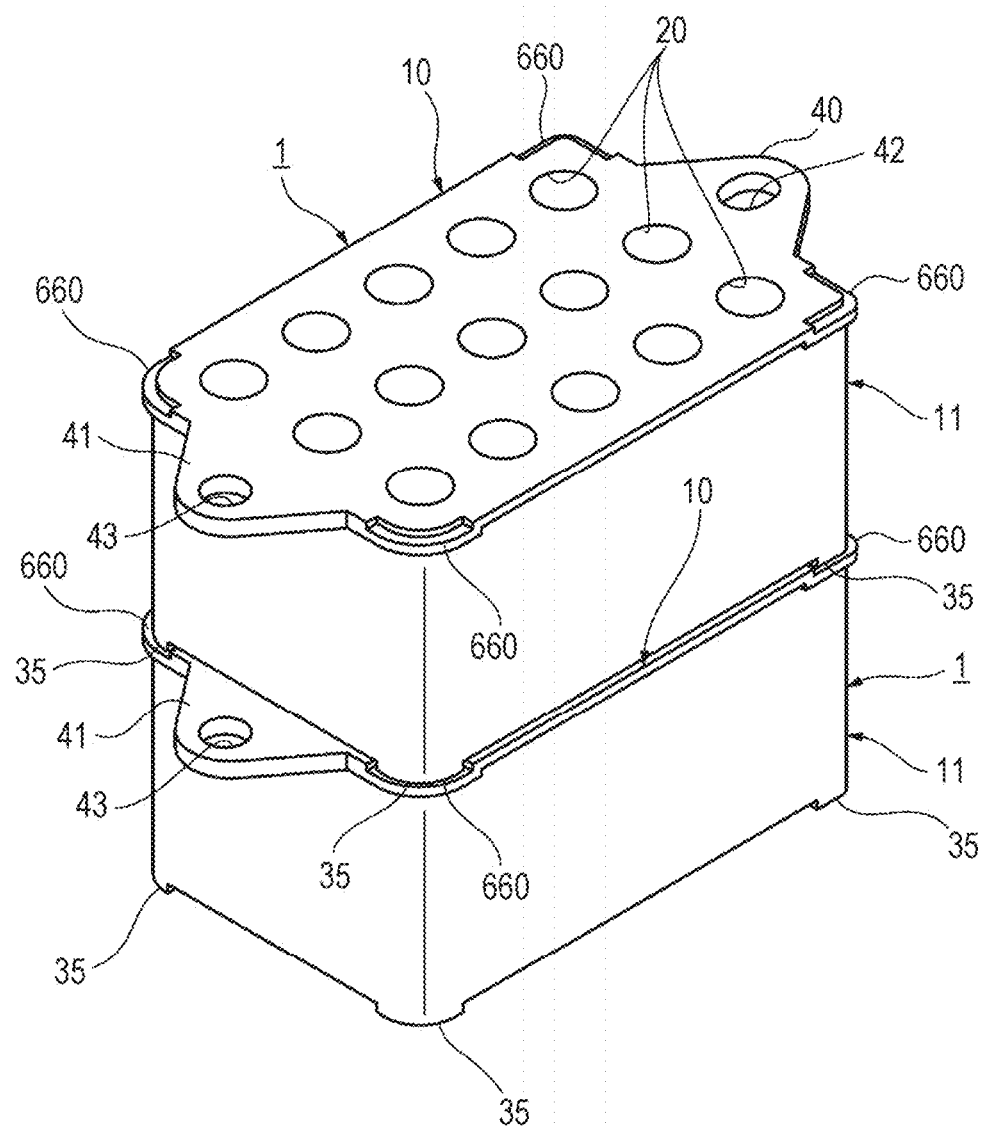
FIG. 21 is a perspective view showing a state in which container racks are stacked.
Figure 22:
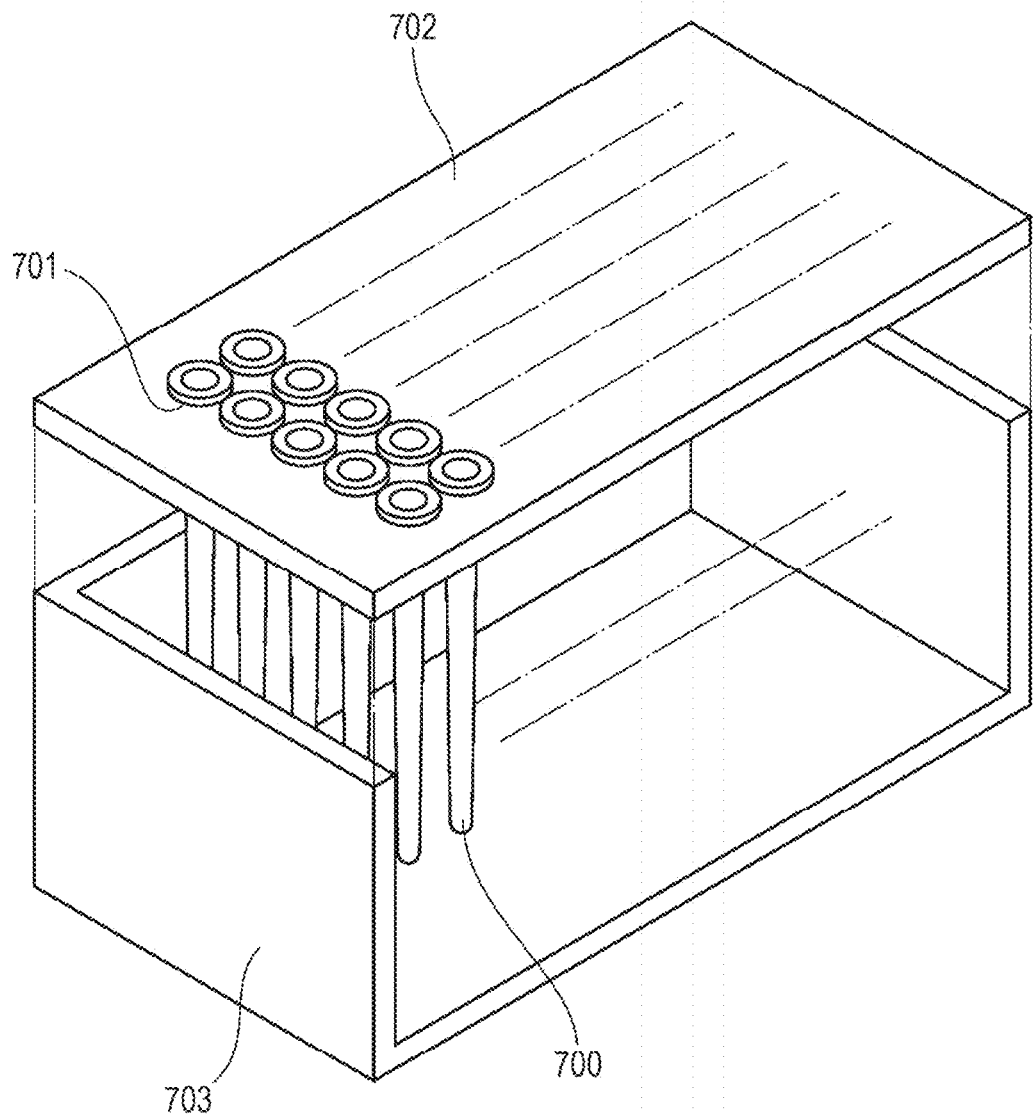
FIG. 22 is a schematic diagram for illustrating a configuration according to a related art.
Figure 23:
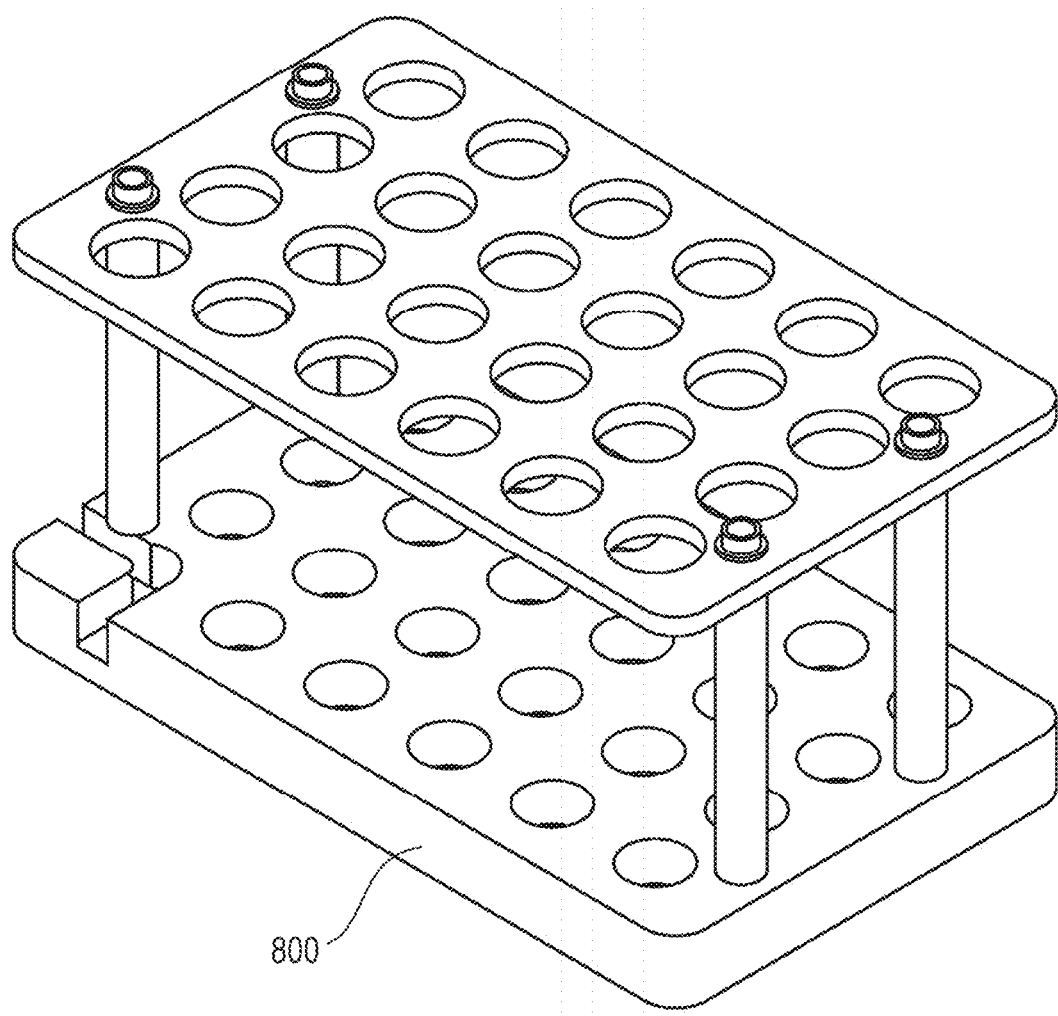
FIG. 23 is a schematic diagram for illustrating a configuration according to a related art.

For example, as shown in FIG. 21, the container rack 1 may include recessed fitting portions 660 that can fit to the protruding portions 35 of the side wall lower portions 30a to 33a of the leg portion 11 at the four corners of the upper surface of the holding portion 10 of the container rack 1. Thus, it is possible to prevent the plurality of container racks 1 from being shifted from each other when they are stacked one above the other. A plurality of container racks 1 can be stacked by using the protruding portions 35 of the side wall lower portions 30a to 33a.

The configuration of the container rack 1 is not limited to that of the above embodiments. For example, the number and arrangement of the holding holes 20 of the holding portion 10, the shape of the leg portions 11, and the like are not limited to those of the above embodiments. The configuration of the specimen analysis device 100 is not limited to that of the above embodiments, either. The specimen analysis device 100 includes the rack installation portion 110 in the immunological test unit 261, but may include the rack installation portion in the blood coagulation test unit 260. Although the specimen analysis device 100 includes both the blood coagulation test unit 260 and the immunological test unit 261, the specimen analysis device 100 may include only the immunological test unit 261.

The specimen analysis device of the present disclosure can also be applied to blood analysis other than the blood coagulation analysis and the blood immunological test, and analysis of specimens other than blood.

The present disclosure is useful for providing a container rack being low-cost while reducing the shaking and displacement of the container in the specimen analysis device, a specimen analysis device in which the container rack can be installed, and a specimen analysis method using the container rack.

What is claimed is:

1. A container rack configured to hold a plurality of containers, the container rack configured to be installed in a rack installation portion of a specimen analysis device, the container rack comprising:
    a holding portion including a plurality of holding holes through which body portions of the containers pass and which hold head portions of the containers;
    a leg portion configured to support the holding portion, the leg portion provided from the holding portion to below the containers held in the holding holes,
    wherein the leg portion includes side walls defining a surrounding periphery of a lower space of the holding portion such that the containers in the holding holes extend into the lower space and are exposed in a bottom view,
    wherein a side wall included among the side walls includes a notch, the notch in the side wall being defined by an upwardly recessed portion of the side wall, and
    wherein an arrangement of the holding holes in the holding portion coincide with an arrangement of insertion holes included in the rack installation portion of the specimen analysis device such that movement of the containers held in the holding holes is restricted by the rack installation portion.

2. The container rack according to claim 1, wherein the notch is configured not to interfere with a container detection sensor of the rack installation portion.

3. The container rack according to claim 1,
    wherein each of the side walls includes a side wall lower portion uneven in an up-down direction, and
    wherein the side wall lower portion is configured such that when the container rack is installed in the rack installation portion of the specimen analysis device, only a downward protruding portion of each of the sidewalls is supported in contact with the rack installation portion.

4. The container rack according to claim 3, wherein an upper surface of the holding portion includes a fitting portion configured to fit into a downward protruding portion of the side wall lower portion of another container rack having an identical configuration with the container rack.

5. The container rack according to claim 1, further comprising a rack positioning portion configured to position the container rack with respect to the rack installation portion of the specimen analysis device.

6. The container rack according to claim 5, wherein the rack positioning portion includes:
    projecting portions configured to protrude from the holding portion in horizontally opposite directions; and
    fastening portions provided in the projecting portions, the fastening portions being fastened to the rack installation portion of the specimen analysis device.

7. The container rack according to claim 6, wherein the fastening portion in one of the projecting portions has an elongated hole, and the fastening portion in another of the projecting portions has a round hole.

8. A specimen analysis device configured to analyze a specimen accommodated in a container, the specimen analysis device comprising:
    a rack installation portion in which a container rack is installed, the container rack including:
        a holding portion including an arrangement of a plurality of holding holes through which body portions of respective containers pass and which hold head portions of the respective containers, and a leg portion configured to support the holding portion, the leg portion provided from the holding portion to below the respective containers held in the holding holes; and an analysis unit configured to analyze a respective specimen accommodated in each of the respective containers conveyed from the container rack installed in the rack installation portion, wherein the rack installation portion includes a container restriction portion positioned to coincide with the arrangement of the holding holes and restrict movement of the respective containers held in the holding holes of the container rack and a rack support portion configured to support the leg portion of the container rack, and the rack support portion is configured to fit with the leg portion of the container rack in a specific direction, and not to fit with the leg portion of the container rack in a direction other than the specific direction.

9. The specimen analysis device according to claim 8, further comprising a conveyance unit configured to convey the respective containers from the container rack installed in the rack installation portion.

10. The specimen analysis device according to claim 8, wherein the container restriction portion has insertion holes into which the respective containers held by the container rack are inserted.

11. The specimen analysis device according to claim 8, wherein the container restriction portion includes a base configured to support bottoms of the respective containers held by the container rack.

12. The specimen analysis device according to claim 11, wherein the base is configured to push the respective containers upward relative to the holding holes when the base supports the bottoms of the containers.

13. The specimen analysis device according to claim 8, wherein the rack installation portion further includes a rack support portion configured to support the leg portion of the container rack.

14. The specimen analysis device according to claim 13, wherein the rack support portion is configured to fit with the leg portion of the container rack in a specific direction, and not to fit with the leg portion of the container rack in a direction other than the specific direction.

15. The specimen analysis device according to claim 8, further comprising a rack positioning portion configured to position the container rack installed in the rack installation portion.

16. The specimen analysis device according to claim 15, further comprising frames on both sides across the rack installation portion, wherein the rack positioning portion is provided on the frames.

17. The specimen analysis device according to claim 8, further comprising a drawer portion including the rack installation portion, the drawer portion configured to be pulled out of and pushed into a housing of the specimen analysis device.

18. The specimen analysis device according to claim 17, further comprising a sensor configured to detect at least one of (i) the rack installation portion of the drawer portion has been pulled out of the housing or (ii) the rack installation portion of the drawer portion is accommodated in the housing.

19. The specimen analysis device according to claim 17, further comprising a lock mechanism configured to fix or release a state in which the rack installation portion of the drawer portion is accommodated in the housing.

20. The specimen analysis device according to claim 8, further comprising a container detection sensor configured to detect that the containers are held in a specific holding hole of the container rack installed in the rack installation portion.

21. The specimen analysis device according to claim 8, further comprising a display unit configured to display a number of the respective containers remaining in the container rack installed in the rack installation portion.

22. A specimen analysis method for analyzing a specimen accommodated in a respective container, the specimen analysis method comprising:

installing a container rack in a rack installation portion of a specimen analysis device by fitting a leg portion of the container rack in a rack support portion of the rack installation portion, the leg portion fitting in the rack support portion in a specific direction, and not fitting in the rack support portion in a direction other than the specific direction, and restricting movement of containers in the container rack by inserting a portion of the containers into the rack installation portion, wherein the containers include the respective container, and the container rack includes:

a holding portion including a plurality of holding holes through which body portions of the containers pass and which hold head portions of the containers, and a leg portion configured to support the holding portion, the leg portion provided from the holding portion to below the containers held in the holding holes; and conveying the respective container from the container rack to an analysis unit and analyzing a specimen in the respective container.

\* \* \* \* \*